United States Patent
Steinhoff et al.

(10) Patent No.: US 11,120,405 B2
(45) Date of Patent: Sep. 14, 2021

(54) SYSTEM AND METHOD FOR INTERVIEW TRAINING WITH TIME-MATCHED FEEDBACK

(71) Applicant: Korn Ferry, Los Angeles, CA (US)

(72) Inventors: Thom Steinhoff, San Gabriel, CA (US); Panos S. Stamus, Easton, PA (US); Bryan Ackermann, West Hollywood, CA (US); John Deyto, Glendale, CA (US)

(73) Assignee: Korn Ferry, Los Angeles, CA (US)

( * ) Notice: Subject to any disclaimer, the term of this patent is extended or adjusted under 35 U.S.C. 154(b) by 0 days.

(21) Appl. No.: 17/024,407

(22) Filed: Sep. 17, 2020

(65) Prior Publication Data

US 2021/0004768 A1 Jan. 7, 2021

Related U.S. Application Data

(63) Continuation of application No. 16/505,028, filed on Jul. 8, 2019, which is a continuation of application No. 16/377,063, filed on Apr. 5, 2019.
(Continued)

(51) Int. Cl.
*G10L 15/08* (2006.01)
*G06Q 10/10* (2012.01)
(Continued)

(52) U.S. Cl.
CPC ..... *G06Q 10/1053* (2013.01); *G06K 9/00315* (2013.01); *G06K 9/00369* (2013.01);
(Continued)

(58) Field of Classification Search
CPC ...... G06Q 10/10; G06Q 10/1053; G06K 9/00; G06K 9/00315; G06K 9/00369;
(Continued)

(56) References Cited

U.S. PATENT DOCUMENTS 8,266,068 B1 9/2012 Foss
8,600,100 B2 12/2013 Hill
(Continued)

FOREIGN PATENT DOCUMENTS

KR 101375119 B1 3/2014
KR 101508927 B1 4/2015
(Continued)

OTHER PUBLICATIONS

International Preliminary Report on Patentability and Written Opinion dated Oct. 6, 2020, for PCT Application No. PCT/US19/26194, filed Apr. 5, 2019, six pages.
(Continued)

*Primary Examiner* — Huyen X Vo
(74) *Attorney, Agent, or Firm* — Morrison & Foerster LLP

(57) ABSTRACT

The present disclosure generally relates to interview training and providing interview feedback. An exemplary method comprises: at an electronic device that is in communication with a display and one or more input devices: receiving, via the one or more input devices, media data corresponding to a user's responses to a plurality of prompts; analyzing the media data; and while displaying, on the display, a media representation of the media data, displaying a plurality of analysis representations overlaid on the media representation, wherein each of the plurality of analysis representations is associated with an analysis of content located at a given time in the media representation and is displayed in coordination with the given time in the media representation.

19 Claims, 22 Drawing Sheets

Related U.S. Application Data

(60) Provisional application No. 62/654,088, filed on Apr. 6, 2018.

(51) Int. Cl.
*G06K 9/00* (2006.01)
*G10L 15/05* (2013.01)

(52) U.S. Cl.
CPC .............. *G10L 15/05* (2013.01); *G10L 15/08* (2013.01); *G10L 2015/088* (2013.01)

(58) Field of Classification Search
CPC ....................... G06K 9/00342; G06K 9/00221; G10L 15/05; G10L 15/08; G10L 2015/088; G10L 25/90; G10L 25/51; G10L 15/26
See application file for complete search history.

(56) References Cited

U.S. PATENT DOCUMENTS

| | | | |
|---|---|---|---|
| 8,907,195 B1 | 12/2014 | Erol | |
| 9,177,225 B1 | 11/2015 | Cordova-diba et al. | |
| 9,571,753 B2 | 2/2017 | Ayers | |
| 9,710,790 B2* | 7/2017 | Taylor ................ | G06Q 10/1053 |
| 9,870,796 B2 | 1/2018 | Goldberg | |
| 10,592,733 B1* | 3/2020 | Ramanarayanan ..... | G10L 15/22 |
| 2004/0186743 A1 | 9/2004 | Cordero | |
| 2009/0319289 A1 | 12/2009 | Pande | |
| 2010/0004977 A1 | 1/2010 | Marci | |
| 2011/0131120 A1* | 6/2011 | Sciuk ............. | G06Q 10/063112 |
| | | | 705/34 |
| 2012/0265770 A1* | 10/2012 | Desjardins ............. | G06Q 30/02 |
| | | | 707/748 |
| 2012/0278824 A1* | 11/2012 | Patil ........................ | H04L 51/32 |
| | | | 725/13 |
| 2013/0308922 A1 | 11/2013 | Sano | |
| 2013/0334300 A1 | 12/2013 | Evans | |
| 2015/0037765 A1* | 2/2015 | Jaggi ........................ | G09B 7/02 |
| | | | 434/169 |
| 2015/0269529 A1* | 9/2015 | Kyllonen ........... | G06Q 10/1053 |
| | | | 705/321 |
| 2016/0019202 A1 | 1/2016 | Adams | |
| 2016/0104180 A1* | 4/2016 | Desautels .......... | G06Q 30/0203 |
| | | | 705/7.32 |
| 2016/0180837 A1* | 6/2016 | Gustavsson ............. | G06F 3/167 |
| | | | 704/251 |
| 2016/0189565 A1* | 6/2016 | Rot .......................... | G09B 5/02 |
| | | | 434/185 |
| 2016/0253989 A1* | 9/2016 | Kuo ...................... | G10L 15/183 |
| | | | 704/257 |
| 2019/0311331 A1 | 10/2019 | Steinhoff | |
| 2019/0333021 A1 | 10/2019 | Steinhoff | |

FOREIGN PATENT DOCUMENTS

| | | |
|---|---|---|
| KR | 20170071144 A | 6/2017 |
| WO | 2019195808 A1 | 10/2019 |

OTHER PUBLICATIONS

Google. (Feb. 26, 2018). "Mock Interview—Simulate Real Interview Experience," Android Apps on Google Play, located Via:Internet (Google, Google Scholar): Technical Literature Search Download URL:https://play.google.com/store/apps/details?id=com.placecom. texttospeech&hl=en, Abstract: Looking forward to an Interview? Mock Interview is designed keeping in just one thing in mind, Your Success! Citations: Fig 2, p. 1.
International Search Report dated Aug. 2, 2019, for PCT Application No. PCT/US19/26194, filed Apr. 5, 2019, five pages.
Interview Buddy. (Feb. 26, 2018). "Virtual Face-To-Face mock interviews with industry experts," online mock interviews with experts, https://interviewbuddyin/ , eleven pages.
Non-Final Office Action dated Dec. 2, 2020 for U.S. Appl. No. 16/505,028, filed Jul. 8, 2019, eight pages.
Non-Final Office Action dated Dec. 8, 2020 for U.S. Appl. No. 16/377,063, filed Apr. 5, 2019, eight pages.
Final Office Action dated Apr. 20, 2021 for U.S. Appl. No. 16/377,063, filed Apr. 5, 2019, ten pages.
Notice of Allowance dated May 4, 2021, for U.S. Appl. No. 16/505,028, filed Jul. 8, 2019, eight pages.

* cited by examiner

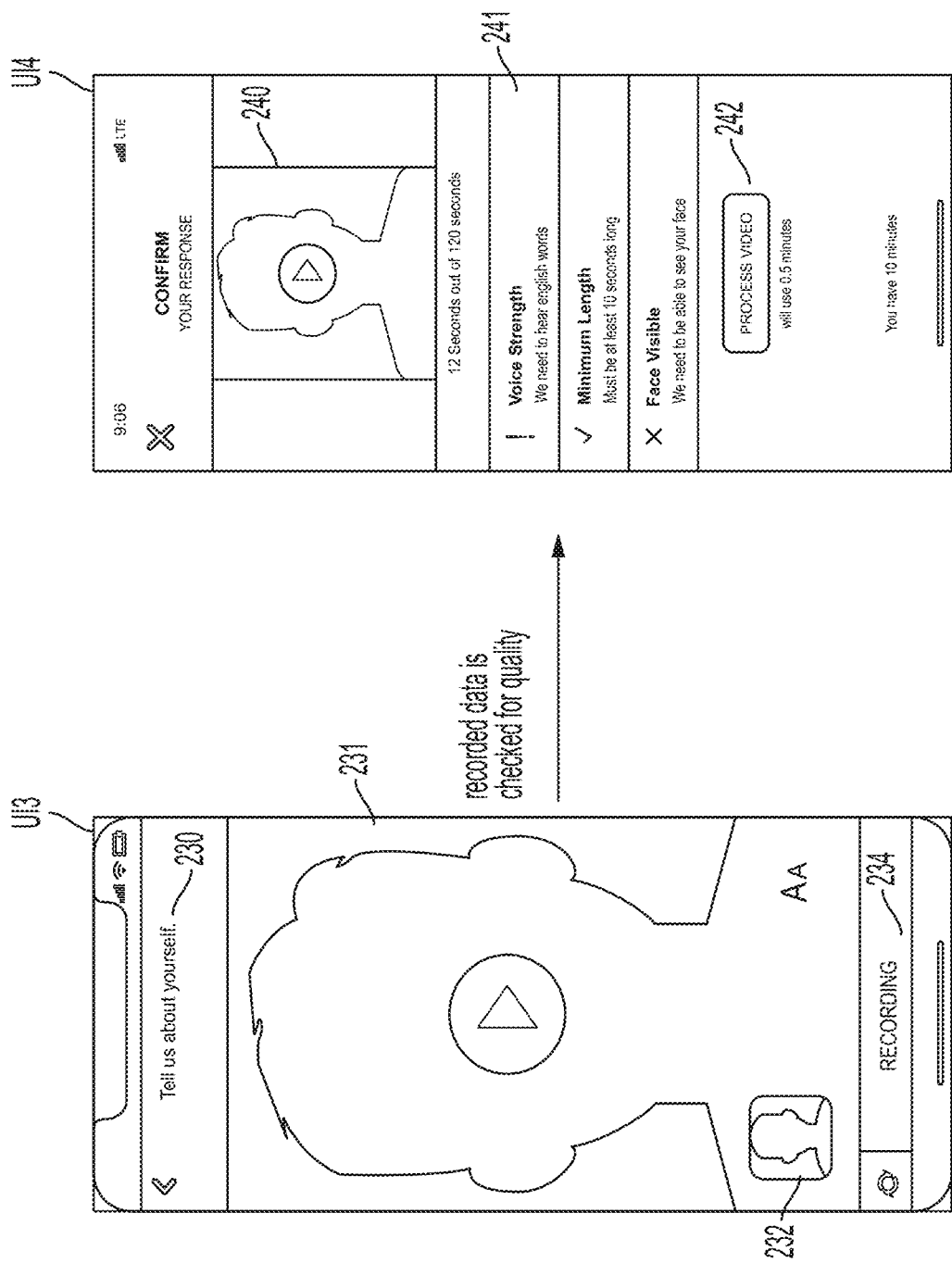

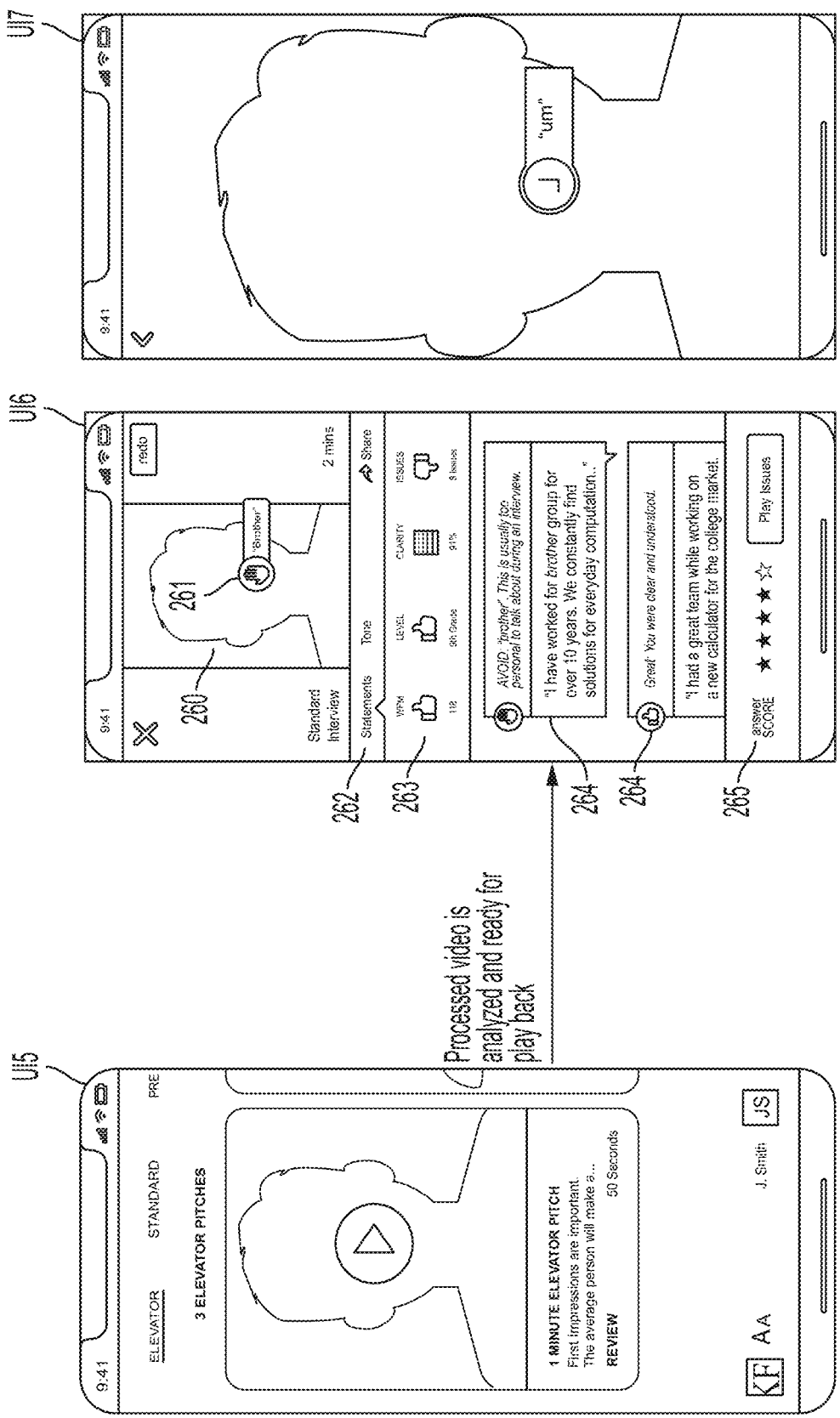

Animation Feedback

Generated Video (Filtered words) 00:05

"I have been an executive for"  "...five years now."

SYSTEM AND METHOD FOR INTERVIEW TRAINING WITH TIME-MATCHED FEEDBACK

CROSS-REFERENCE TO RELATED APPLICATIONS

This application claims priority to the U.S. Non-Provisional patent application Ser. No. 16/505,028, filed Jul. 8, 2020, which claims priority to U.S. Non-Provisional patent application Ser. No. 16/377,063, filed Apr. 5, 2019 (U.S. Patent Application Publication No. 2019/0333021), which claims priority to U.S. Provisional Patent Application Ser. No. 62/654,088, filed Apr. 6, 2018, entitled "System and Method for Interview Training with Time-Matched Feedback," the contents of which are hereby incorporated by reference for all purposes.

FIELD OF THE DISCLOSURE

This relates generally to interview training and providing interview feedback.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 2A-J illustrate exemplary user interfaces in accordance with some embodiments of the disclosure.

DETAILED DESCRIPTION

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

Figure 1:
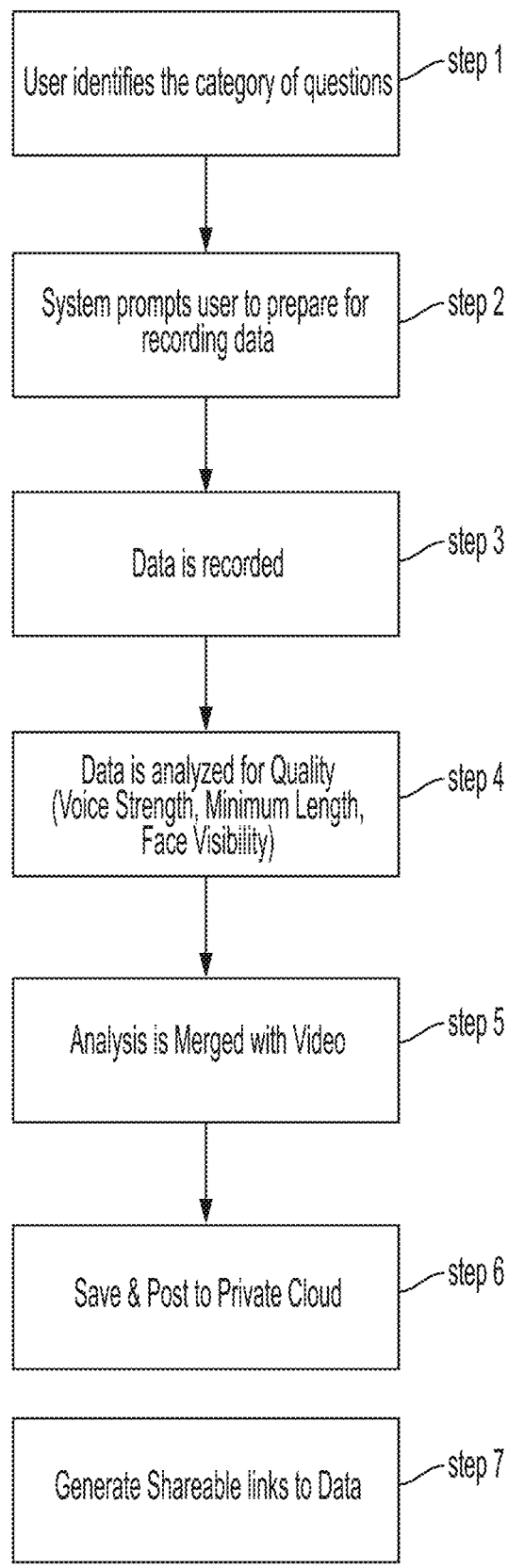
FIG. 1 illustrates an exemplary interview analysis and feedback process in accordance with some embodiments of the disclosure.

FIG. 1 illustrates an exemplary interview analysis and feedback process in accordance with some embodiments of the disclosure. At step 1 of the process, the user can be provided with a list of categories of questions, and the user can select one of the categories of questions. For example, possible categories of questions can be a 1 minute elevator pitch, a standard interview, a presentation style interview, or a public speaking engagement. Other suitable categories of questions relevant to training an interviewee may be possible. The categories of questions may be displayed as a card or icon or a text list. In some embodiments, the user can scroll through the categories of questions. For example, scrolling can be by swiping the screen left or right, up or down, or by actuating a scroll bar.

In some embodiments, at step 1 of the process, instead of selecting a category of questions to record, the user can choose to upload a pre-recorded video for analysis. In some embodiments, this video can be of the user or exemplary videos of other candidates or famous speeches. The system can analyze and process the uploaded video independent of the categories of questions. For example, the system may skip step 2 and 3 and move directly to step 4 for quality analysis and full analysis. In some embodiments, this feature can provide the user analysis and feedback and gain insights from exemplary models.

At step 2 of the process, the system will prompt the user to prepare for recording data. In some embodiments, the data recorded can be audio only data or both audio and video data. In some embodiments, the user can upload a pre-recorded audio or video file. A description of the category of questions can be displayed. In some embodiments, the user may actuate a user interface element to select the category and begin recording.

At step 3 of the process, the system will begin recording data. In some embodiments, recording data may occur by using the microphone or the camera built into the user device (e.g., a smartphone, a computer, a tablet computer, etc.). In some embodiments, external recording mechanisms may be used. In some embodiments, a display of the recording can be displayed on the device. In some embodiments, a series of interview questions are presented to the user of the device, and the user responds to those questions, which the user device records. In some embodiments, the series of interview questions are displayed in text form and a video of an interviewer asking the question can also be displayed concurrently. In some embodiments, one or more of the series of interview questions are displayed in only a text form. In some embodiments, a live two-way conferencing session can be used to present interview questions to the user of the device. For example, VOIP can be used to connect a live interviewer to the user. In some embodiments, augmented reality can be used in addition to displaying a live interviewer (e.g., depicting the interviewer as sitting on another side of an interview table opposite the user). In some embodiments, a digitally-rendered avatar can be used to present interview questions. The digitally-rendered avatar can be three-dimensional. The digitally-rendered avatar can visually and audibly present questions to the user. The computer-rendered avatar can also sync its visual movements with the audio (e.g., moving a mouth in sync with words of the question). In some embodiments, the digitally-rendered avatar may adjust its visual movements to make eye-contact with the user (e.g., if the interviewer is looking down at the screen, the digitally-rendered avatar can adjust its eye positon to appear to be looking directly at the user). In some embodiments, the digitally-rendered avatar can display as if the avatar was in a video chat with the user. In some embodiments, other suitable means of presenting a question to the user can be used. In some embodiments, step 3 continues until the user responds to every interview question in the active category of questions and the user device records each of the user's responses. In some embodiments, the user can actuate a button to indicate completion of one question and move to the next question. In some embodiments, video can be recorded on the user device. In some embodiments, video can be recorded on a remote device and then transmitted to the user device.

At step 4 of the process, the system analyzes the recorded data for quality. In some embodiments, analyzing the recording for quality includes analyzing the voice strength, minimum length, and the visibility of the user. In some embodiments, if the quality analysis fails to yield a suitable quality, the user is prompted to re-record the data and the system returns to step 2 of the process. In some embodiments, the user can view the recorded data. In some embodiments, the user can confirm the recorded data and actuate a button to begin interview analysis.

At step 5 of the process, the recorded data is analyzed by the user device and/or in combination with a remote computer system. In some embodiments, analyzing the recorded data can include identifying words or phrases to avoid. In some embodiments, analyzing the recorded data can include identifying cliché words or phrases, filler words, or hesitations. In some embodiments, analyzing the recorded data can include analyzing the data for clarity and understandability. For example, the responses can be analyzed to determine how well the response answers the question posed to the user. In some embodiments, analysis can include detecting accents or dialects. In some embodiments, accent and dialect analysis can provide the user feedback on pronunciation, enunciation, or other clarity and understandability metrics. In some embodiments, analyzing the recorded can include determining the grade level of the user's responses. In some embodiments, analyzing the recorded data can include identifying the conversation speed of the user (e.g., words per minute). In some embodiments, analyzing the recorded data can include identifying the tone of the user response. In some embodiments, identifying the tone of the user response can include identifying the energy level of the user. In some embodiments, identifying the tone of the user response can include the attitude of the user. In some embodiments, identifying the tone of the user response can include the mood of the user. In some embodiments, identifying the tone of the user response can include identifying the demeanor of the user. In some embodiments, analysis can be based on the words, phrases, statements or sentences used by the user. In some embodiments, analysis can be based on the facial expressions or body language of the user. In some embodiments, analysis of facial expressions or body language of the user may include analysis of cultural norms. For example, if the user is practicing for an interview in a certain country, analysis may be performed on what gestures or head movements to avoid. In some embodiments, analysis can be based on volume, speed, pitch, or other voice characteristics of the user. In some embodiments, analysis can be based on other suitable metrics. In some embodiments, the recorded data can be given a score. In some embodiments, the score can be based on some or all of the analysis. In some embodiments, any or all of the above analysis is performed by artificial intelligence, machine learning, neural network, or other suitable means. In some embodiments, a live interview coach can analyze the video and provide the aforementioned feedback. In some embodiments, the live interview coach can provide voice, video, or textual feedback.

In some embodiments, the analysis can be merged with the video. In some embodiments, merging the analysis with the video includes associating the analysis and feedback with the time of the event which caused the analysis feedback. For example, if the system identifies a filler word at 1:30 in the recording, the analysis and feedback to avoid the filler word can be associated with 1:30 in the recording. In some embodiments, the analysis and feedback can be associated with slightly before or after the event (e.g., 0.5 seconds, 1 second, 2 second) to promote viewability.

At step 6 of the process, the analysis merged video can be saved and posted to a private cloud account. In some embodiments, the video recording including the overlaid pop-up icons can be exported. In some embodiments, a watermark can be embedded into the exported video. For example, a company watermark or branding can be embedded into the background, the foreground, a corner of the video, or any other suitable location. In some embodiments, the saved video can be a proprietary file format. In some embodiments, the saved video can be stored in the memory of the application. In some embodiments, the saved video can be exported to a standard file format, such as AVI, MP4, or any other suitable file format. In some embodiments, different video and audio encodings can be used. In some embodiments, only the video recording is exported. In some embodiments, the video can be saved to the user's local storage on the device. In some embodiments, the video can be uploaded or posted to a cloud account. In some embodiments, the cloud account can be a private user account associated with the application. In some embodiments, the cloud account can be a private user account on a public cloud storage operator. In some embodiments, the cloud account can be a public storage location. In some embodiments, other suitable storage locations can be used.

At step 7 of the process, shareable links to the video can be generated. In some embodiments, the shareable link is a Uniform Resource Locator (URL) to a web location. In some embodiments, the shareable link is a proprietary file identifying the location of the video. In some embodiments, other suitable pointers can be used. In some embodiments, step 7 is not performed.

Figures 2A, 2B:
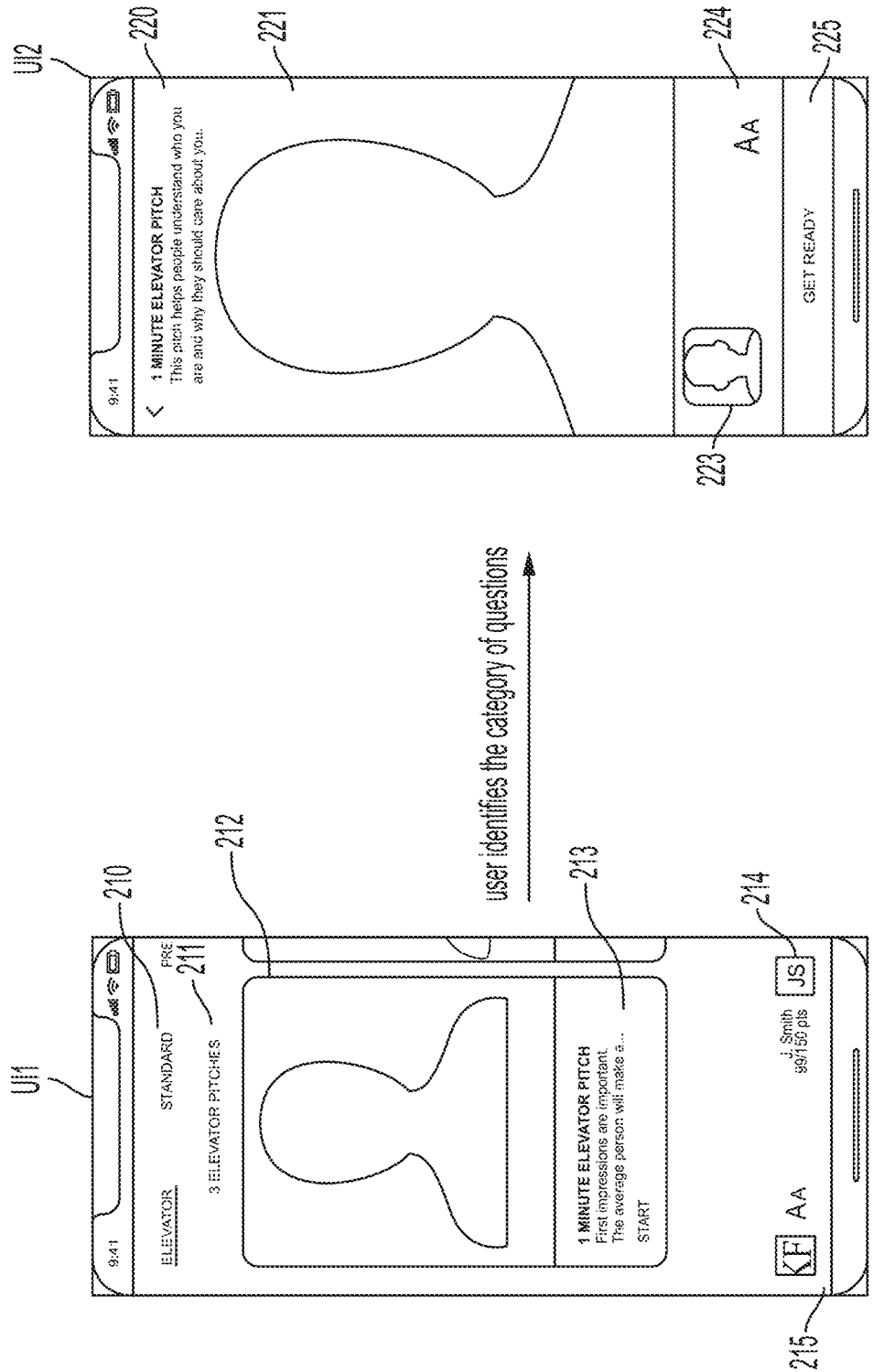
Figures 2H, 2I, 2J:
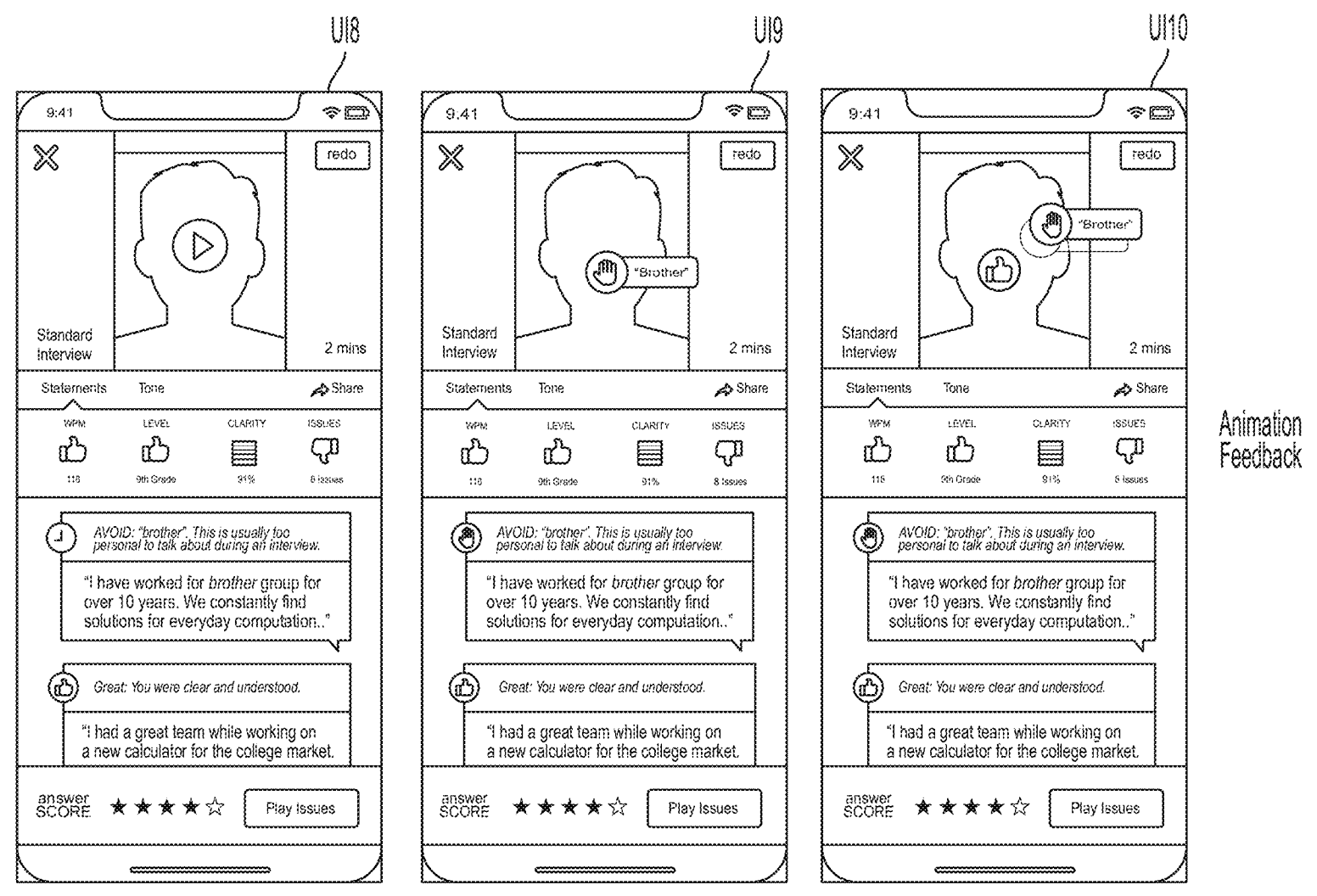

FIG. 2 illustrates exemplary user interfaces in accordance with some embodiments of the disclosure. Exemplary user interface UI1 illustrates displaying categories of questions 210 for the user to select. In some embodiments, categories of questions 210 can be elevator pitches, standard interviews, or presentations or other categories of questions 210 can be provided. In some embodiments, the user can select a category of question 210, which then displays the subcategories of questions 212 associated with the selected category of question. In some embodiments, the list of categories of questions 210 is scrollable. When a category of questions 210 is selected, a quantity of subcategories 211 is displayed. In some embodiments, subcategories of questions 212 are displayed as cards, icons, or a text list. In some embodiments, the subcategories of questions 212 can be scrollable. In some embodiments, the subcategories of questions 212 can include a representation of the subcategory. For example, the representation can be a still picture, an animated video, or other suitable representation. In some embodiments, the subcategories of questions 212 can include a description of the subcategory 213. In some embodiments, the user interface UI1 can include a representation of the user 214. In some embodiments, the representation of the user 214 can be the user's name, user's profile picture, or a unique identifier (e.g. screen name or ID). In some embodiments, the representation of the user 214 can be any other suitable representation. In some embodiments, the user interface UI1 includes a font adjustment element 215 to adjust the font size of the text in the user interface UI1. In some embodiments, the font adjustment element 215 is set to a default font size. In some embodiments, when the user sets the font adjustment element 215 to a setting other than the default font size, the setting persists.

Exemplary user interface UI2 illustrates prompting the user to prepare for recording data. In some embodiments, user interface UI2 can be displayed when the user selects a category of questions 212. In some embodiments, UI2 can include a description of the category of questions 220. In some embodiments, UI2 can include a representation of the category of questions 221 (e.g., still picture, an animated video, or other). In some embodiments, UI2 can include a representation of the user 223. In some embodiments, the representation of the user 223 can be a still photograph. In some embodiments, the representation of the user 223 can be a live video of the user taken from a camera of the device. In some embodiments, UI2 can include a font adjustment element 224 to adjust the font size of the text in the user interface UI2. In some embodiments, the setting of font adjustment element 224 may be the setting of font adjustment element 215. In some embodiments, UI2 can include a user interface element 225, actuation of which will begin data recording.

Exemplary user interface UI3 illustrates recording data related to the selected category of questions. In some embodiments, UI3 can be displayed after user actuates user interface element 225 and begins an interview session. In some embodiments, UI3 can include a text prompt of the interview question 230. In some embodiments, UI3 can display a pre-recorded video of an interviewer 231 asking the interviewer question. In some embodiments, UI3 can display a representation of the user 232. In some embodiments, the representation of the user 232 can be a live video of the user taken from a camera of the device. In some embodiments, the representation of user 232 can be a digitally-rendered avatar. The digitally-rendered avatar can be three-dimensional. The digitally-rendered avatar can sync its movements to the visual and audio data of the video. In some embodiments, the video will be analyzed, and the digitally-rendered avatar can sync its movements to the movements of the user (e.g., blinking, smiling, head position, eye position, and mouth movements can be analyzed and mirrored in the movements of the digitally-rendered avatar). The digitally-rendered avatar has the advantage of removing a potential factor for bias by displaying only representation of the user instead of visually displaying the user. In some embodiments, UI3 can display an indicator 234 to indicate that data is currently being recorded.

Exemplary user interface UI4 illustrates an exemplary video recording confirmation page. In some embodiments, UI4 can include a representation of the recorded video 240. In some embodiments, the representation of the recorded video 240 can be interactive. In some embodiments, the user can actuate the representation of the recorded video 240 to view playback of the recorded video. In some embodiments, UI4 can include the results of the video quality analysis 241. In some embodiments, the results of the video quality analysis 241 can include an indication of the quality of the voice strength of the user, the maximum length of the video, or the facial visibility of the user. In some embodiments, the results of the video quality analysis 241 can provide feedback on how to improve the video quality analysis 241. In some embodiments, if the results of the video quality analysis 241 are not sufficient, then user interface element 242 is not enabled (e.g. greyed out, crossed out, not displayed, or other suitable means). In some embodiments, if the results of the video quality analysis 241 are sufficient, then user interface element 242 is enabled. In some embodiments, the user can actuate user interface element 242 to begin analysis of the video data.

Exemplary user interface UI5 illustrates an exemplary analysis and feedback selection page. In some embodiments, after the analysis is performed and analysis is merged with the video, the user can select which merged video to playback. For example, if the user has recorded data for several different categories of questions, then UI5 may display multiple videos with analysis and feedback for the user to select.

Exemplary user interface UI6 illustrates an exemplary analysis and feedback playback interface. UI6 can display and playback the analyzed video 260 (e.g., the video selected from UI5). While the playback is in progress, representations of analysis or feedback may pop up over the video 261 (e.g., as an overlay). The representations of analysis or feedback can be graphical icons or text, or both. The representations can fade in and persist for a threshold amount of time and fade out (e.g., 0.5 seconds, 1 second, 1.5 seconds, 2 seconds, or other suitable amounts of time). In some embodiments, the representations can have an opaque or translucent background. In some embodiments, the representations of analysis or feedback can be associated with the time of the event which caused the analysis feedback. For example, if the system identifies a filler word at 1:30 in the recording, the representation of analysis or feedback can be associated with 1:30 in the recording. In some embodiments, the representation of analysis or feedback will then be displayed when the playback of the recording has reached the associated time (e.g., when playback of the recording reaches 1:30). In some embodiments, the analysis and feedback can be associated with slightly before or after the event (e.g., 0.5 seconds, 1 second, 2 second) to promote viewability.

UI6 can include tabs of analysis and feedback 262. The tabs 261 can be the statements made by the user along with feedback, or analysis of the tone of the video, or other insights that can benefit the interviewer. In some embodiments, the statements tab can display representations of quantitative analysis 263. For example, the quantitative analysis can be the talking speed of the user (words per minute), the educational level of the speaker, the level of clarity (e.g., enunciation, word choice, sentence structure, etc.), and the total number of issues identified. UI6 can include a feedback pane that displays items of feedback 264. For example, items of feedback 264 can include the statement that triggered the feedback, the analysis, and recommendations for improvement. The feedback panel can be a scrollable list. In some embodiments, the feedback panel will automatically scroll based on the playback location of the video in accordance with the times associated with the items in the feedback panel. In some embodiments, the user can scroll the feedback panel forward or backwards without affecting the playback of the video. In some embodiments, scrolling the feedback forward or backwards will cause the playback of the video to fast forward or rewind. The items of feedback 264 are also selectable such that selecting the items will move the playback location of the video to the location associated with the feedback item. For example, if the user scrolls the feedback panel to 1:30 in the video while the video is still playing at 1:00, and selects the feedback item associated with 1:30 in the video, the video playback will move to 1:30. The video will then playback thereby showing the statements that triggered the feedback. In some embodiments, selecting different portions of the feedback pane triggers different responses. In some embodiments, selecting the transcribed text will cause playback of the statement that was transcribed, and playback will continue beyond the statement that was transcribed (e.g. until reaching the end of the video or interrupted by the user). In some embodiments, selecting the analysis and recommendation element will cause playback of only the statement that triggered the feedback (e.g., playback will end at the end of the statement). UI6 can include an overall analysis score for the video 265. Overall analysis score can be based on some or all of the aforementioned analyses or other suitable analyses.

In some embodiments, UI6 can include a tone tab to provide feedback on the user's tone (as described in further detail below with respect to FIG. 4). In some embodiments, UI6 can include an insights tab. In some embodiments, the insights tab can include discussion on how the user should answer a particular question, the consequences of different types of responses, or what the interviewer is generally looking for with respect to certain questions. In some embodiments, the insights tab can include recorded interviews of experts discussing the aforementioned topics. In some embodiments, the insights tab can be specific feedback on the questions presented to the user and how the user responded to the questions.

In some embodiments, if a live coach is used to analyze the video, the feedback pane may include pre-recorded video or audio of the coach providing feedback. In some embodiments, the coach can provide textual feedback, in which case the feedback pane may look the same or similar to the feedback pane described above.

Exemplary user interface UI6 illustrates an exemplary analysis and feedback playback interface in a full-screen playback mode. In some embodiments, the user can trigger this mode by actuating a button or by turning the device from portrait to landscape. In some embodiments, when in full-screen playback mode, the feedback pane is not displayed. In some embodiments, only the pop-up icons are displayed during playback. In some embodiments, the feedback tray can be displayed with a transparent or a translucent background. In some embodiments, the items of feedback (e.g., items of feedback 264 in UI6) can be displayed as an overlay. In some embodiments, the items of feedback can fade-in and fade-out as the video is played. In some embodiments, the user can scroll through the items of feedback when they are displayed. In some embodiments, selecting the items of feedback will exit the full screen mode and perform actions described with respect to UI6.

Exemplary user interface UI8-UI10 illustrates the progression of the user interface as video is played back. For example, UI9 illustrates a pop-up and overlaid icon indicating an item of feedback (e.g. hand icon). In some embodiments, the pop-up and overlaid icons can be the representations of feedback and analysis as described with respect to UI6. As described in further detail above with respect to UI6, in some embodiments, the pop-up and overlaid icon can be associated with the time of the event which caused the pop-up and overlaid icon. For example, if the system identifies a filler word at 1:30 in the recording, the pop-up and overlaid icon can be associated with 1:30 in the recording. In some embodiments, the pop-up and overlaid icon will then be displayed when the playback of the recording has reached the associated time (e.g., when playback of the recording reaches 1:30). In some embodiments, the pop-up and overlaid icon can be associated with slightly before or after the event (e.g., 0.5 seconds, 1 second, 2 second) to promote viewability.

UI10 illustrates the item of feedback moving from a first location to a second location (e.g., the icon pans to the side of the video and fades out as the portion of the video corresponding to the icon is played and passed). In some embodiments, multiple items of feedback can be displayed concurrently (e.g., while hands icon is being displayed, thumbs up icon is displayed).

Figure 3:
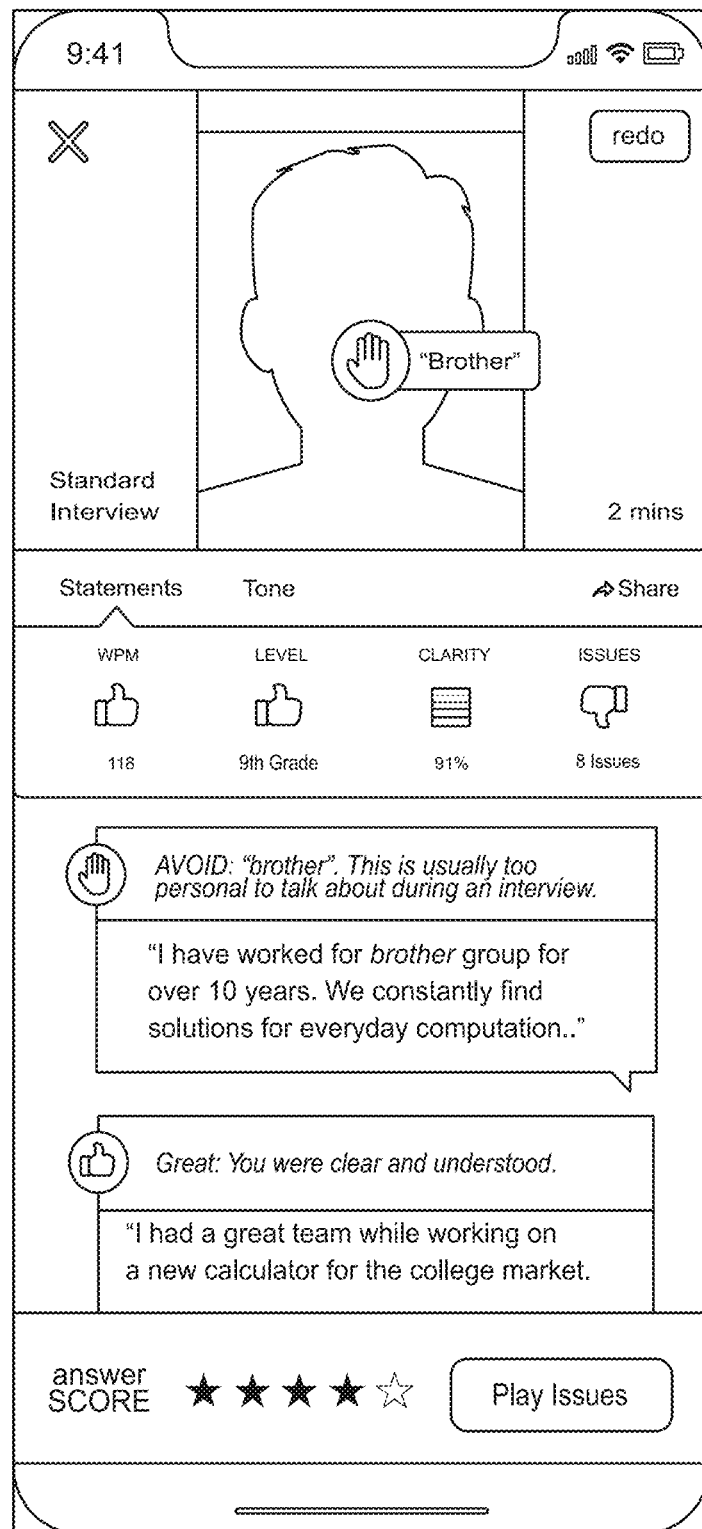
FIG. 3 illustrates exemplary user interfaces in accordance with some embodiments of the disclosure.

FIG. 3 illustrates an exemplary user interface in accordance with some embodiments of the disclosure, such as UI10 in FIG. 2.

Figure 4:
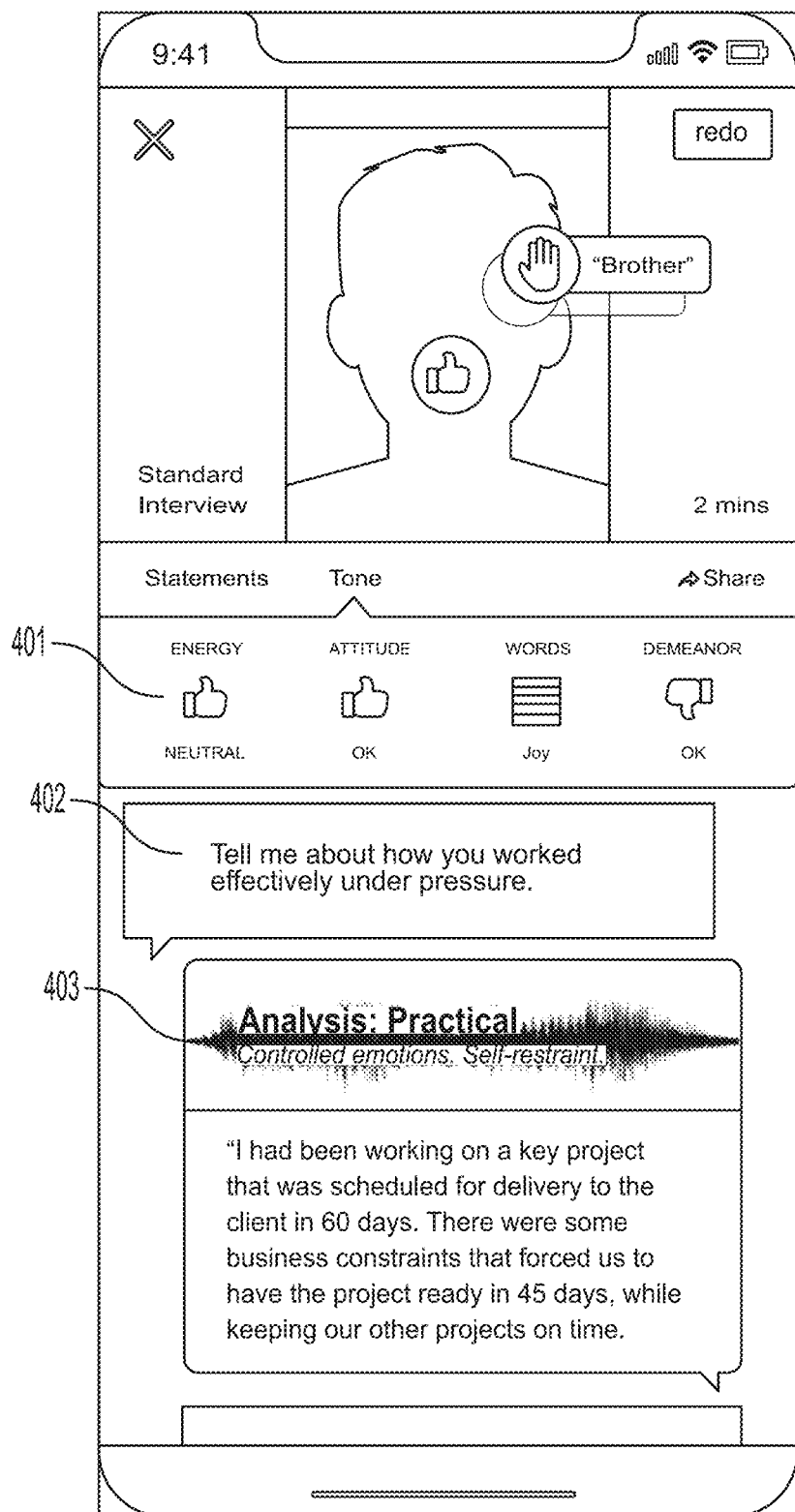
FIG. 4 illustrates exemplary user interfaces in accordance with some embodiments of the disclosure.

FIG. 4 illustrates an exemplary user interface in accordance with some embodiments of the disclosure. In some embodiments, a tone tab is displayed. In some embodiments, the tone tab displays the analysis and feedback associated with the tone of the user. In some embodiments, the tone tab can display representations of qualitative analysis 401. For example, the qualitative analysis can be the energy level of the user, the attitude of the user, the mood of the user, and the demeanor of the user. The representations of qualitative analysis 401 can include feedback regarding their desirability (i.e. "Neutral," "OK," "Joy," etc.). The tone tab can also include a feedback pane, similar to the feedback pane described above with respect to the Statements tab. In some embodiments, the tone tab can display the question presented to the user 402. In some embodiments, the tone tab can display a representation of the analysis 403 of the response to the question presented to the user.

Figure 5:
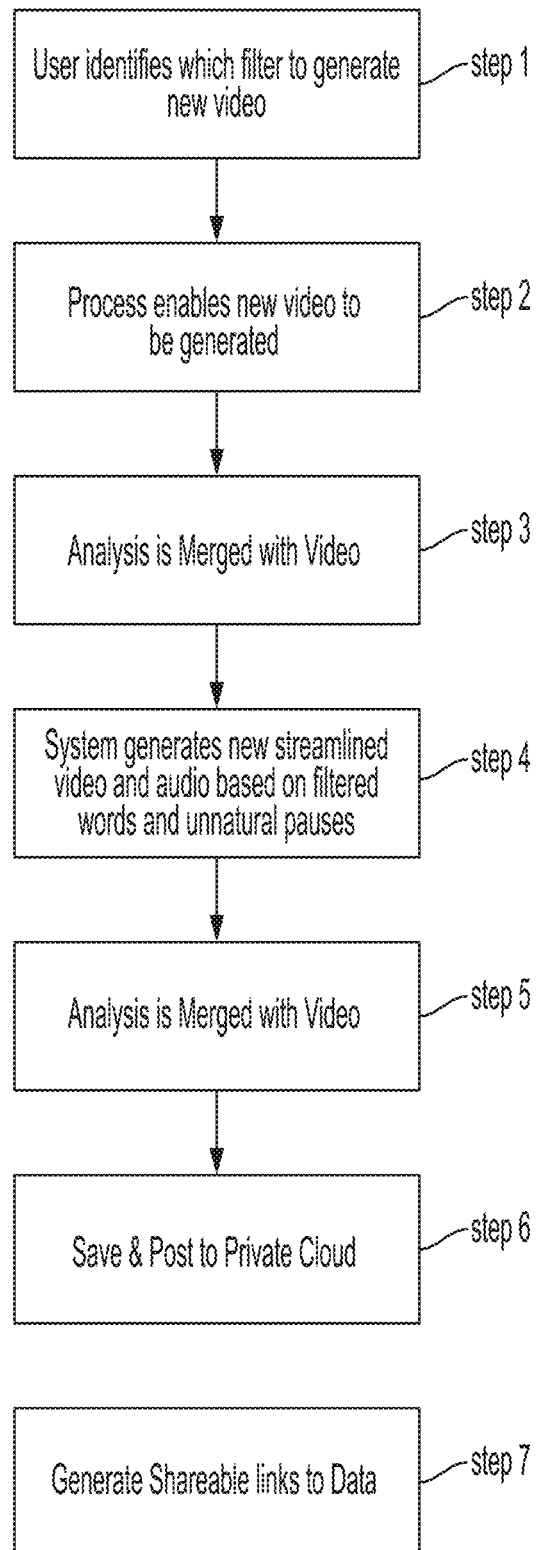
FIG. 5 illustrates an exemplary interview filtration process in accordance with some embodiments of the disclosure.

FIG. 5 illustrates an exemplary interview filtration process in accordance with some embodiments of the disclosure. In step 1 of the filtration process, the user identifies the filter to be used in generating a new video. In step 2 of the filtration process, the process enables a new video to be generated. In step 3 of the filtration process, analysis is merged with the original video. In step 4 of the filtration process, a new video (and accompanying audio) is generated removing the items that have been filtered by the user selected filter. For example, certain words, phrases, filler words, or unnatural pauses can be filtered out by the filtration process. In some embodiments, the new video will have no issues identified in the analysis, substantially no issues identified in the analysis, or a reduced amount of issues identified in the analysis compared to before the filtration process. In some embodiments, the new video can be the non-filtered portions of the original video stitched together. In step 5 of the filtration process, the analysis is merged into the new video. In some examples, the analysis merged into the new video can contain the remaining analysis and feedback (e.g., from FIGS. 1-4 above) relating to content that was not filtered out of the original video. In step 6 of the filtration process, the new video can be saved and uploaded or posted to a private cloud, similar to step 6 of the process described with respect to FIG. 1, above. At step 7, a shareable link can be generated, similar to step 7 of the process described with respect to FIG. 1, above.

Figure 6:
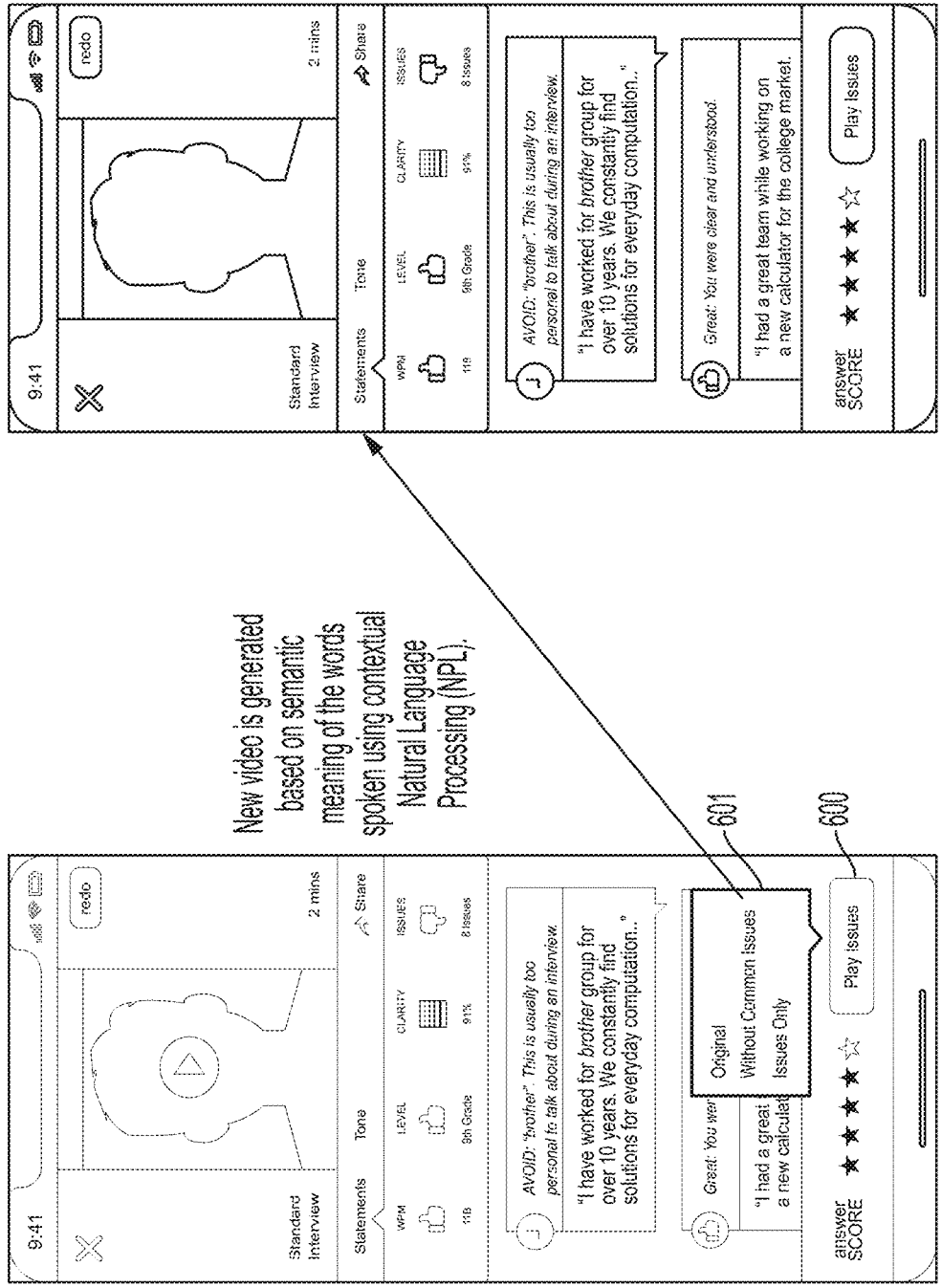
FIG. 6 illustrates exemplary user interfaces in accordance with some embodiments of the disclosure.
Figure 7A:
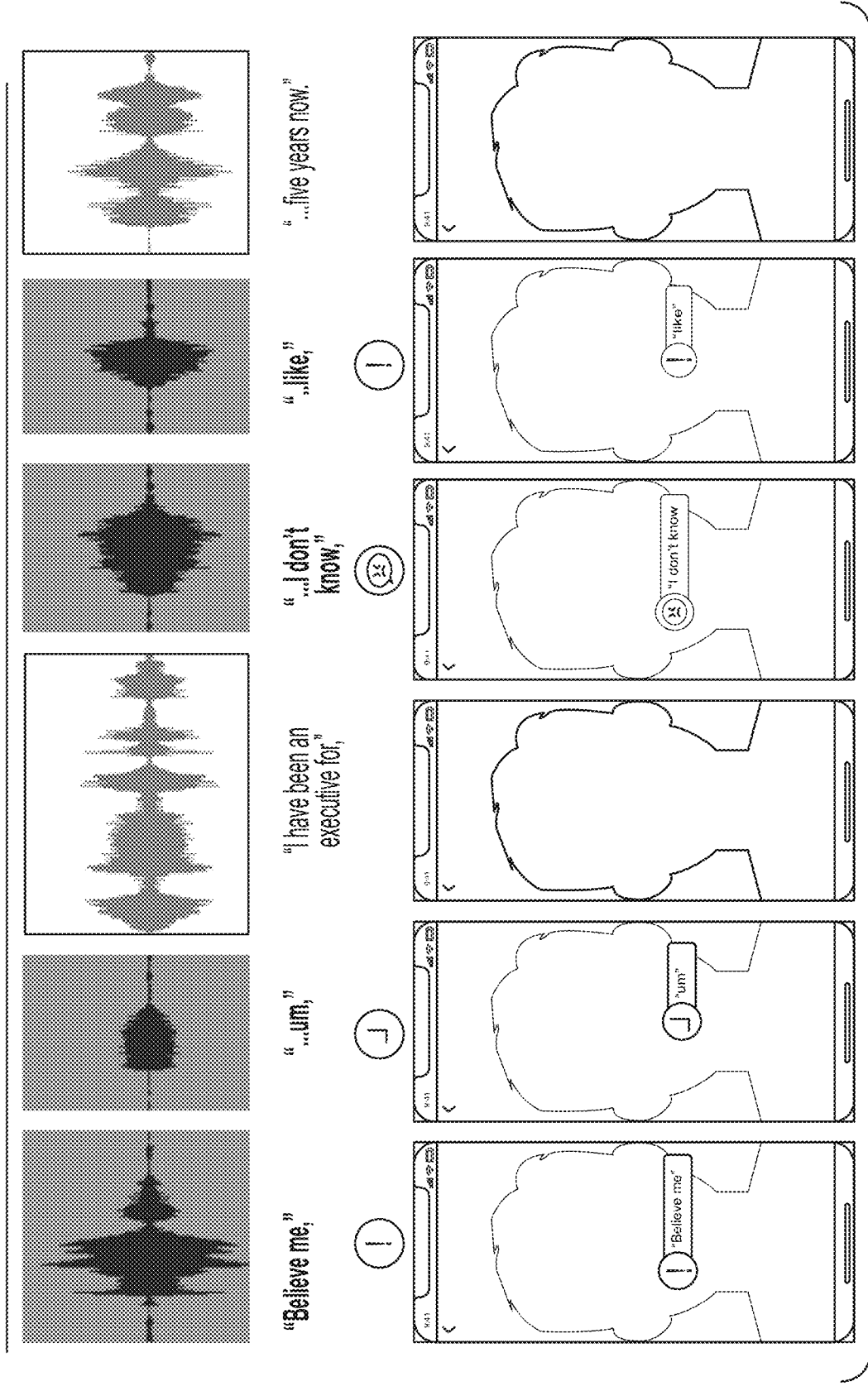
FIGS. 7A-B illustrate an exemplary video filtration user interface in accordance with some embodiments of the disclosure.
Figure 7B:
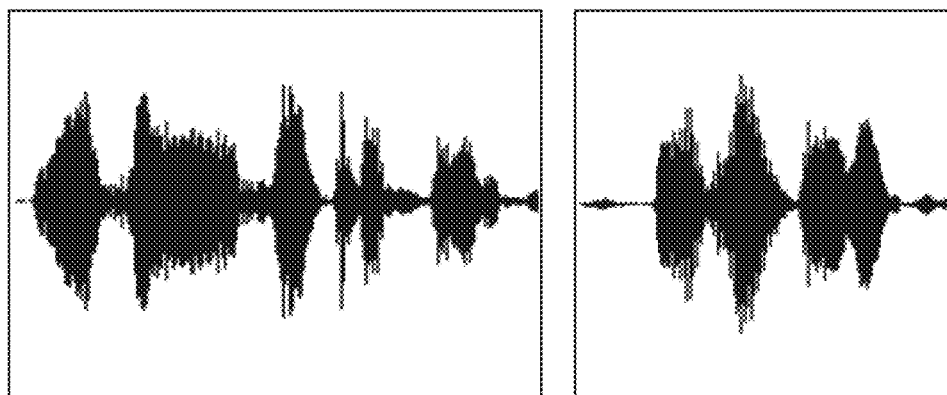
Figure 7B:
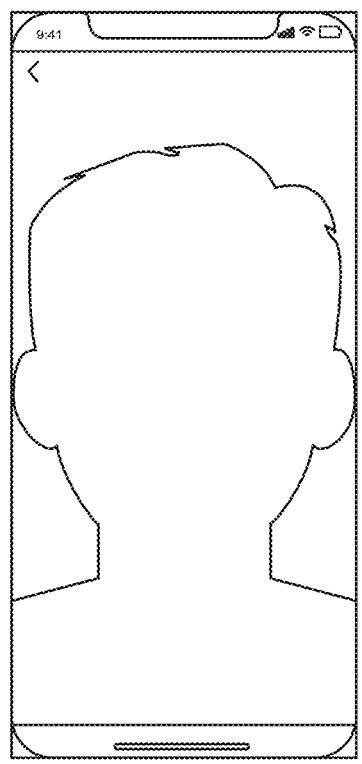
Figure 7B:
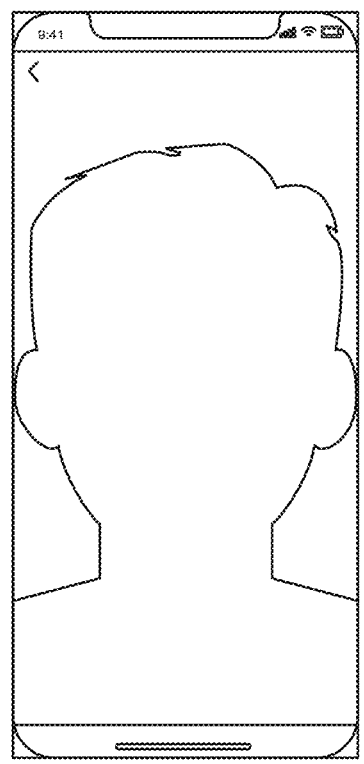

FIG. 6 illustrates exemplary user interfaces in accordance with some embodiments of the disclosure. In some embodiments, the user can choose the filter by actuating a user interface element 600. In some embodiments, actuating user interface element 600 displays a plurality of filter options for the user. For example, the user may choose to filter the video without common issues, with only the issues, or to view the original video (e.g., no filtration). In some embodiments, the filtration process can perform a contextual natural language processing (NPL) to identify words, phrases, or issues to filter during the filtration process.

FIG. 7 illustrates an exemplary video filtration user interface in accordance with some embodiments of the disclosure. In some embodiments, a video filtration process will identify portions of the video and audio that contain elements that have been selected to be filtered. For example, the video filtration process may identify undesirable phrases, filler words, or unnecessary pauses to filter as identified in the analysis of FIGS. 1-4. In some embodiments, the video filtration user interface can provide playback of the video and visually distinguish the segments of the video marked for filtration from segments of the video that are not marked for filtration (e.g., by color, label, or any other suitable visual distinguishing means). For example, as part of the video filtration process, the user may cause playback of the video and when the playback reaches portions of the video that the filtration process has identified to be removed, those portions will be displayed with a red tinge cast over the video. In some embodiments, other suitable types of indicators that the portion of the video has been marked for removal can be used. After performing the filtration process, the generated video may be a stitched version of the portions of the original video that were not filtered. In some embodiments, the stitching of the video may be based on an analysis of the video and audio in order to blend the video and prevent unnatural skipping of the video or stuttering of the audio. In some embodiments, the filtered video appears substantially seamless. For example, the stitching process may analyze the background images and the position of the person in the recording to match, as closely as possible, frames which will provide a substantially seamless transition.

Figure 9:
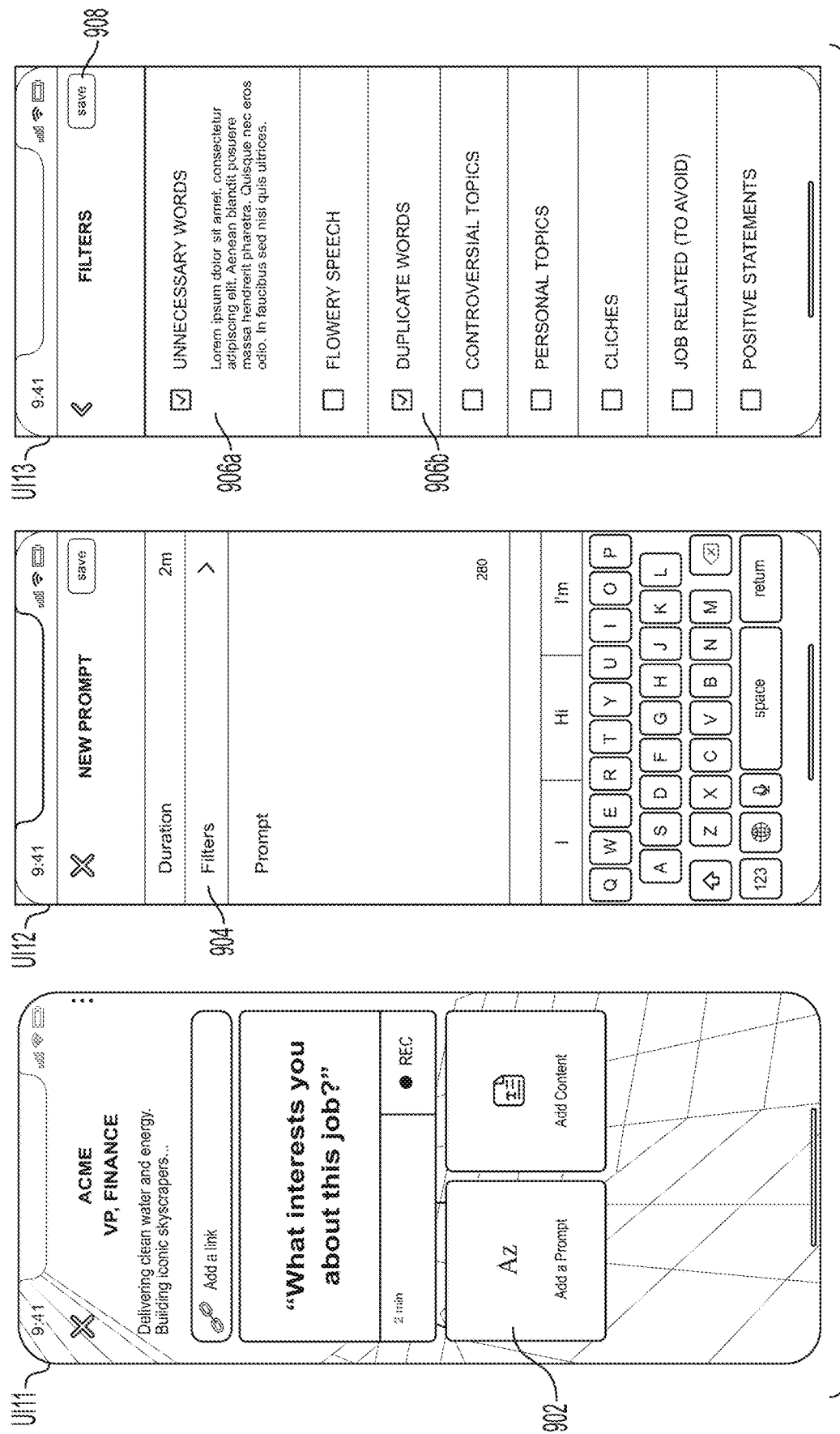
FIG. 9 illustrates an exemplary video filtration user interface in accordance with some embodiments of the disclosure.

FIG. 9 illustrates an alternate embodiment for a video filtration user interface. In some embodiments, the user interface allows a user to customize different filters to apply to a video, as shown in UI11-13.

In some embodiments, the video filtration user interface can be used by a creator creating prompts (e.g. interview questions). In the depicted example, UI11 comprises UI element 902 for adding a new prompt. UI element 902 can be selected (e.g. using a mouse or using a finger) to cause UI12 to be displayed. UI12 allows the user to specify the prompt, a duration of the answer (e.g., in a recorded video), and custom filters to be automatically applied to the answer. Upon a user selection of the UI element 904, UI13 is displayed. UI13 provides a plurality of affordances (e.g., check boxes) for customizing a list of filters that can be applied to the video. One or more filters can be selected by selecting one or more UI elements 906. In some embodiments, the customized list of filters must be saved by selecting UI element 908.

The video filtration interface can utilize a time-synced transcription of the audio or video. In some embodiments, a transcript can be generated based on speech detected in the video. For example, the video may comprise a recorded user speaking into a microphone, and a transcript can be generated based on the recorded user's speech. In some embodiments, the transcript is time-synced to the video. For example, each word in the transcript can be associated with a time segment comprising a time in the video when the recorded user begins speaking the word and a time in the video when the recorded user finishes speaking the word. In some embodiments, confidence data is associated with each word. The confidence data can indicate the confidence that the word is accurately transcribed. In some embodiments, confidence data is associated with each associated time segment. The confidence data can indicate the confidence that the association accurately links the time segment and the portion of the video. However, it is contemplated that other methods of time-syncing the transcript to the video can be used. For example, the beginning and end of each word can be associated with a particular frame or time stamp in the video. In some embodiments, the time-synced transcript can also associate pauses with the corresponding time segment in the recorded video. In some embodiments, every pause has an associated time segment. In some embodiments, only pauses longer than a certain threshold have an associated time segment. In some embodiments, punctuation has an associated time segment. In some embodiments, laughter has an associated time segment. In some embodiments, the time-synced transcript can comprise transcribed phonemes instead of transcribed words. According to those embodiments, the phonemes can also be time-synced in a similar manner as transcribed words. In some embodiments, multiple transcript versions from different providers can be generated. In some embodiments, an API call can be made to one or more transcript generating algorithms. In some embodiments, the user can select the transcript version they wish to use. In some embodiments, the used transcript version is selected automatically. In some embodiments, the time-synced transcript is stored separately from the video file. For example, the time-synced transcript can be stored as a JSON file.

Filters can comprise a list of words or phrases that are undesirable and should be filtered out of the video. For example, the "Unnecessary Words" filter corresponding to UI element 906a can comprise one or more predefined words including "like" and "uh." When the filter corresponding to UI element 906a is activated, the submitted video can be edited so that portions of the video where a recorded user says "like" or "uh" will be removed from the submitted video. For example, the video filtration process can analyze the generated transcript by comparing the words in the transcript with any selected filters. If the video filtration process identifies one or more words in the transcript that matches one or more words in the selected filters, a filter can be triggered and the video filtration process can edit the video such that the corresponding time segments are removed. The corresponding time segments can be removed such that the remaining time segments can be stitched together to create a continuous, edited video. The edited result can be in accordance with the embodiments described in FIG. 7 wherein the resulting edited video prevents unnatural skipping of the video or stuttering of the audio. In some embodiments, the resulting edited video can display simple cuts to the next segment. In some embodiments, the resulting edited video can utilize animations between segments (e.g., fading or motion blending). In some embodiments, filters can comprise a list of words or phrases that are desirable. If the video filtration process triggers a filter of positive words, the corresponding time segments may not be removed. In some embodiments, a visual indicator may be displayed to provide positive reinforcement. In some embodiments, filters comprise 20-100 words, but it is noted that any number of words or combinations of words can be used.

In some embodiments, filters can comprise programming logic. In some embodiments, filters can comprise association data. The association data can store an association of a filter with one or more user clients. In some embodiments, filters can comprise type data. The type data can store information regarding types of speech to be filtered out. For example, type data can be flag (e.g., specific words or phrases), hesitation (e.g., pauses in speech), duplicate (e.g., immediately repeated words or phrases), or overuse (e.g., often repeated words or phrases). In some embodiments, an icon can be displayed during video playback when a filter is applied. The icon can be associated with a particular filter or set of filters and visually indicate which filter or set of filters is applied to the video. In some embodiments, filters can comprise penalty data. The penalty data can determine how an analysis score should be changed when one or more portions of a video are edited according to a filter. For example, the penalty data may assign a numeric value that can be deducted from the analysis score for each instance the filter is triggered by the video. In some embodiments, the penalty data may assign a negative number that can be deducted from the analysis score if the filter comprises positive words or phrases. In some embodiments, filters can comprise sort order data. The sort order data can determine which filter should be visually indicated when one or more words trigger more than one filter. In some embodiments, filters can comprise string data. The string data can cause a string of text to display when a filter is triggered. For example, if the word "Father" is used such that an overuse filter is triggered, the text "The word 'Father' is often used" may be displayed while the video is played back.

In some embodiments, filters can comprise exceptions. For example, the filter corresponding to UI element 906a can have a rule based on programming logic to not filter out "like" when used in the phrase "I like to." For example, if the recorded user says "I like to ski," the video filtration process can identify that the word "like" is used immediately after the word "I" and immediately before the word "to." The video filtration process can then determine that an exception is met and forgo removing the time segment corresponding to the word "like."

In some embodiments, filters can comprise programming logic that creates a dynamic filter. For example, a dynamic filter can identify overused words in the submitted video. In accordance with this embodiment, the video filtration process can count the frequency of each word used in the submitted video based on the created transcript. In some embodiments, the dynamic filter can identify words that are used at a frequency above a specified threshold. In some embodiments, the dynamic filter can identify words that are used at a frequency above a relative threshold determined by total number of words used or the length of the submitted video. In some embodiments, the dynamic filter does not flag common words like "of" or "the."

In another example, the "Duplicate Words" filter associated with UI element 906b can also be a dynamic filter. In accordance with this embodiment, the dynamic filter can identify one or more words or combinations of words that are repeated immediately adjacent to each other. For example, the recorded user can say "I think . . . I think my strengths involve communication." The dynamic filter in this embodiment can identify the repetition of the combination of words "I think" and remove the time segment associated with one of the repeated combinations.

In some embodiments, the video filtration user interface can provide an affordance for the user to edit the list of words in a filter. In some embodiments, the video filtration user interface can provide an affordance for the user to create their own filter using a custom list of one or more words. For example, if the creator's name is known to the recorded user, the creator can create a new filter that comprises the creator's name. In accordance with this embodiment, the recorded user can say "Thank you for your time, Jane" during the recorded video. The video filtration process can then identify "Jane" as matching the creator's name in the new filter and remove the associated time segment. The resulting video and audio can then play back as "Thank you for your time" with "Jane" removed.

In some embodiments, the user can create their own customized filter of words or combinations of words in different languages. In accordance with this embodiment, the time-synced transcript can be generated with the appropriate speech-to-text methods for a particular language. In some embodiments, the submitted video will be analyzed to detect the used language, and the appropriate speech-to-text method will be selected. The customized filter can then compare words in the custom filter with the time-synced transcript text. In some embodiments, the video filtration interface can then play-back the video with time segments corresponding to the filtered words removed. This has the advantage of allowing the video filtration user interface to be compatible in other languages.

In some embodiments, the list of filters can be customized for each individual recorded video. For example, the recorded user can select a different set of filters for each submitted video in a series of prompts. In some embodiments, the selected set of filters can apply to the entire series of prompts. For example, a creator can have a preferred set of filters that the creator wishes to be applied to every submitted video for every recorded user for this series of prompts. In some embodiments, a set of preferred filters can be applied by default to each submitted video. In some embodiments, the user can edit the default set of filters for each individual video.

Examples of filters include but are not limited to: words to avoid, clichés, business clichés, controversial words, profanity, personal words, hesitation or stalling, job-related words, duplicate words, words that are overused, positive things to say, extra words that are unnecessary, technical jargon words, military jargon words, overly technical words, overly academic words.

Figure 8:
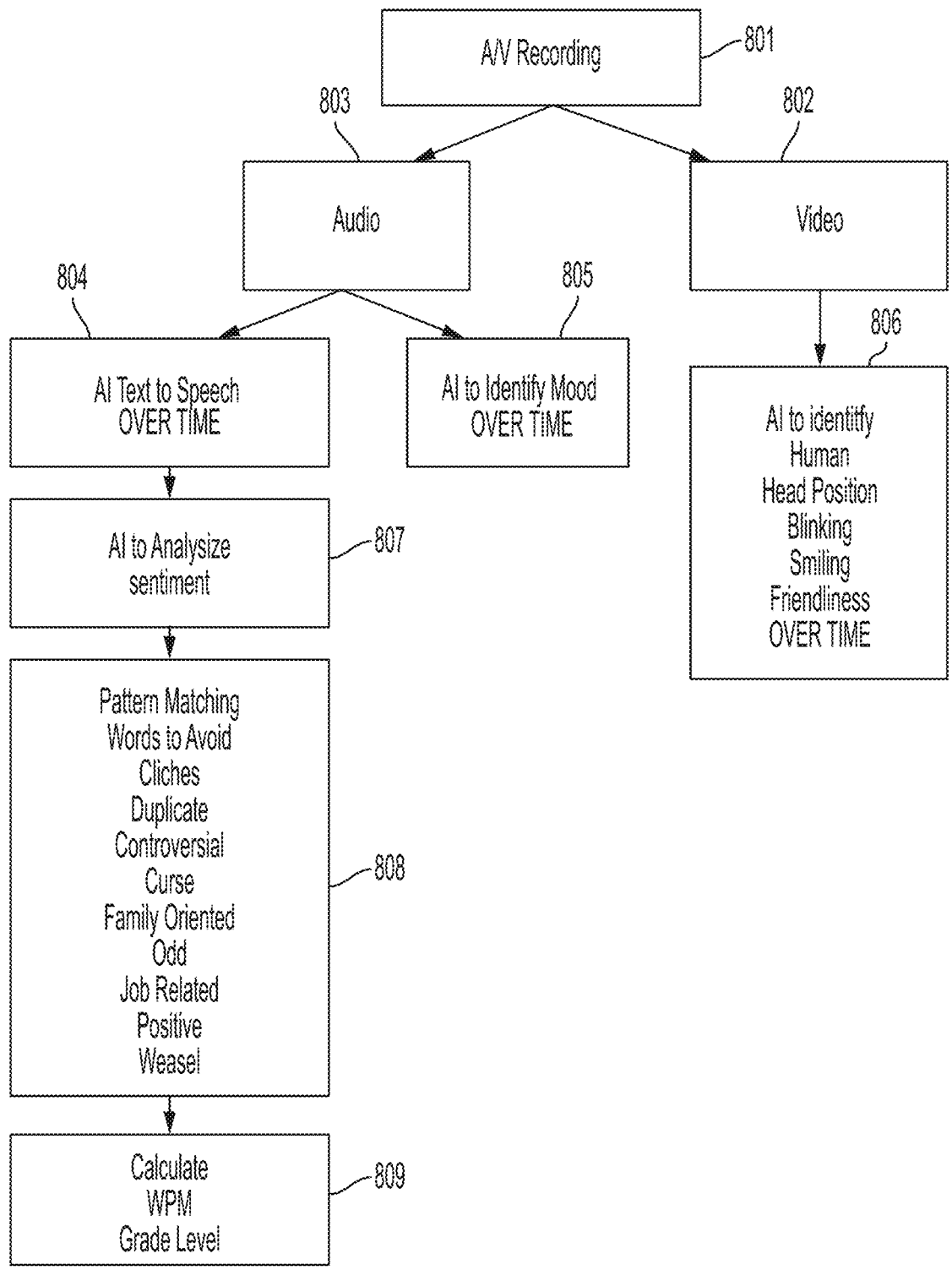
FIG. 8 illustrates an exemplary interview analysis process in accordance with some embodiments of the disclosure.

FIG. 8 illustrates an exemplary interview analysis process in accordance with some embodiments of the disclosure. At step 801 of the interview analysis process, audio and video can be recorded and stored. At step 802, the video component of the recording can be processed. At step 806, the video component of the recording can be analyzed for head positioning, blinking characteristics (e.g., pattern, speed, etc.), smiling characteristics (e.g., large small, small smile, crooked smile, etc.), and friendliness. In some embodiments, the analysis can be based on the facial expressions, body language, or hand gestures of the user. For example, facial features and dynamics can be analyzed over multiple frames to identify emotional responses and micro expressions. This analysis, in some embodiments, can be used to identify an amount of sincerity, empathy, or other personality traits. In some embodiments, this analysis can be performed for a predetermined number of frames, as a moving average, or of the entire video as a whole.

At step 803, the audio component of the recording can be processed. At step 804, the spoken speech can be transcribed into text. In some embodiments, transcription of the text can support multiple languages. For example, the user can select different languages in which the system will provide the interview. In some embodiments, the transcription of text can support multiple languages within the same recording. For example, if the user is practicing to interview for a position requiring use of multiple languages, the system can transcript and analyze the user's ability to use multiple languages. At step 805, the audio can be analyzed to identify the mood of the speaker. In some embodiments, this analysis is performed for a predetermined number of frames, as a moving average, or of the entire video as a whole. At step 807, the audio can be analyzed to identify the sentiment of the speaker. In some embodiments, the audio can be analyzed to identify the user's sentiment toward a particular person or topic. For example, analysis of the user's sentiment can provide insights into how the user presents himself/herself and how to improve the user's presentation. At step 808, the audio can be analyzed to identify issues to avoid. For example, a pattern matching engine can be used to identify words to avoid, such as clichés, duplicate words, controversial topics, curse words, family oriented phrases, odd or awkward words or phrases, job related topics, weaseling, jargon, or slang. In some embodiments, step 808 can analyze the audio for favorable items, such as positive phrases or relevant buzzwords. At step 809, the audio can be analyzed to determine the talking speed of the user (e.g., words per minute) and the grade level of the responses (e.g., sophistication of phrases, grammar, sentence structure, vocabulary, etc.). In some embodiments, the audio can be analyzed for pitch, tone, quality, and cadence. The cadence analysis can further analyze common verbal habits such as up speak (e.g., ending sentences in an upwards tone that insinuates a question), vocal fry (e.g., ending sentences with a slight growl tone), "YouTube speak" (e.g., mimicking the talking pattern of successful YouTube users), and words spoken with an accent.

Figure 10:
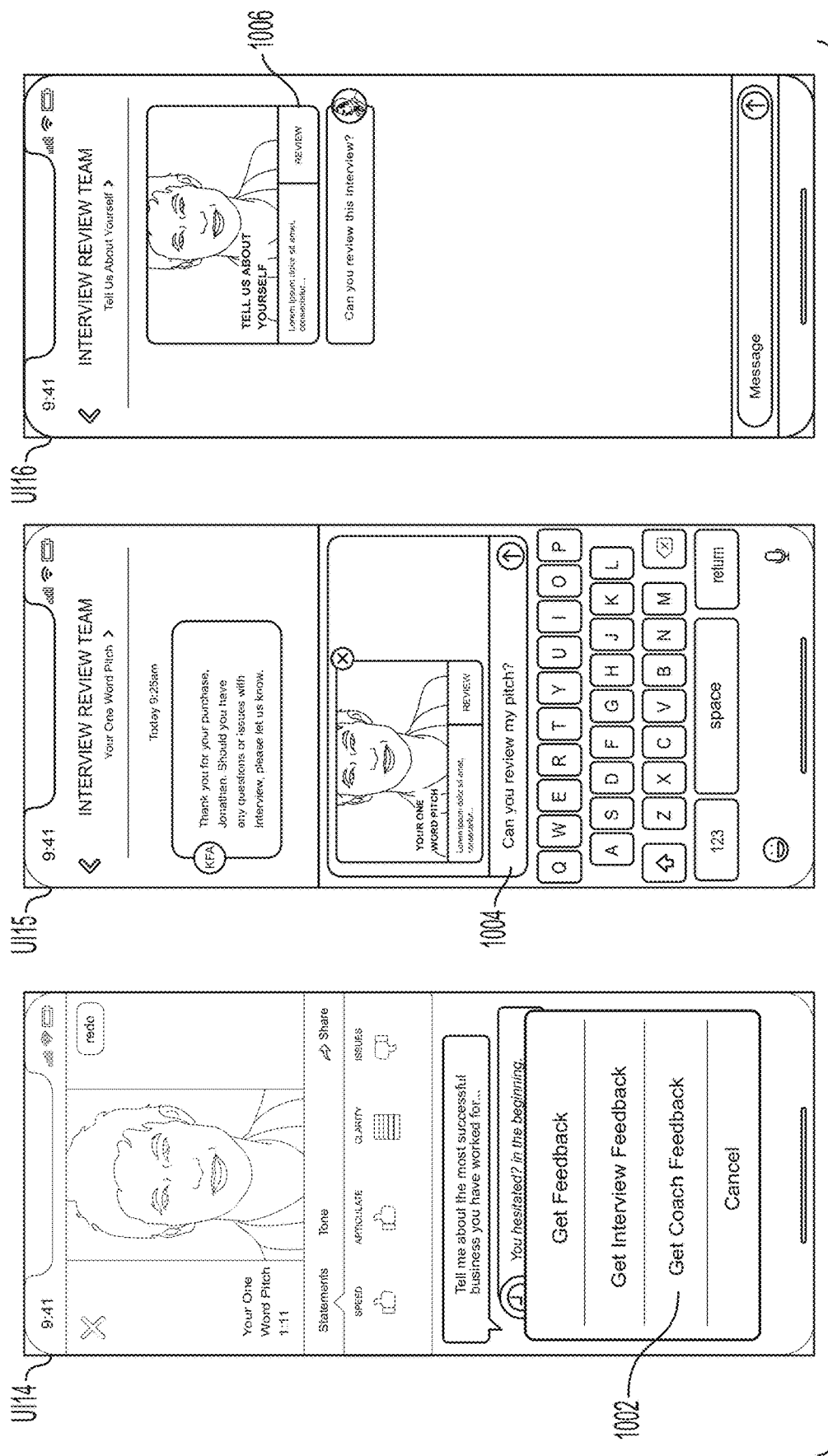
FIG. 10 illustrates an exemplary coaching user interface in accordance with some embodiments of the disclosure.
Figure 11:
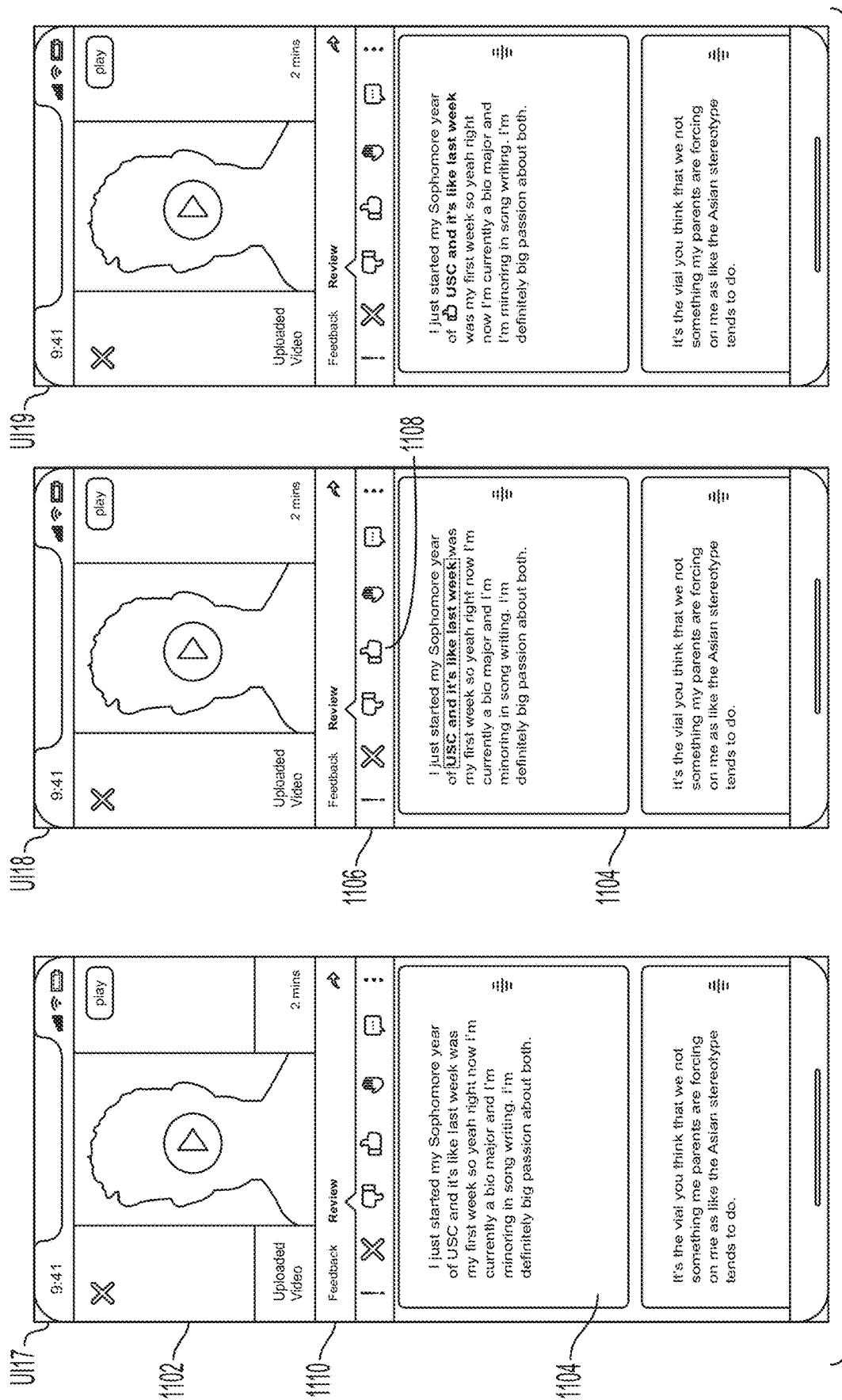
FIG. 11 illustrates an exemplary user interface for reviewing and editing media content in accordance with some embodiments of the disclosure.

FIG. 10 illustrates an exemplary user interface for requesting feedback from a live coach directly, according to some embodiments. In UI14, the user can select UI element 1002 to request feedback from a live coach on a recorded video. In response to the user selection, the device displays a messaging user interface U15. U15 allows the user to initiate a messaging session with the live coach and transmit the recorded video to the live coach. In some embodiments, the live coach is a human who will watch the recorded video and provide feedback to the user. In some embodiments, the live coaching feature is a premium feature that the user must pay to utilize. In some embodiments, the live coaching feature can be part of a subscription of services that the user is already subscribed to. In UI15, the user can enter one or more messages in a chat box 1004. After composing the one or more messages, the user can select a software button 1008 to transmit the recorded video and the one or more messages. The one or more messages can be displayed to the live coach in addition to the recorded video on the live coach's device (e.g., via a different instance of the application installed on the live coach's device).

In some embodiments, the live coach can send one or more messages back to the user in the messaging session, and the conversation can be displayed in UI16. In some embodiments, the user can review the recorded video directly from UI16 by selecting UI element 1006.

FIGS. 11-18 illustrate exemplary user interfaces for reviewing and editing media content (e.g., video or audio), according to some embodiments of an editing system. In some embodiments, the user interfaces can be part of a software application installed on a device (e.g., mobile phone). In some embodiments, the media content can be generated on the device (e.g., by a camera and a microphone of the mobile phone), or generated on a different device and transmitted to the device for review and further processing. In the depicted examples, the media content can be a recording of a user performing a mock interview, and the recording can be transmitted to a remote device (e.g., to a live coach via the messaging session in FIG. 10). In some embodiments, the media content can be a self-promotional video generated and edited on the same device.

In some embodiments, the remote device receives the recorded video (e.g., from the device of a user) and performs speech recognition based on the recorded video to obtain a transcript. The remote device further stores one or more mappings between portions of the recorded video and portions of a transcript. In some embodiments, speech recognition is performed by the user's device to generate a corresponding time-synced transcript. When the user shares the recorded video with the coach (e.g., via UI14-UI16), the user shares the recorded video together with the corresponding time-synced transcript. In some embodiments, a remote server receives the recorded video and performs speech recognition and generates the time-synced transcript. The remote server can send one or both of the recorded video and the time-synced transcript to the user's device or to the remote device, or to both devices.

Each of UI17-19 includes a video region 1102 and a transcript region 1104. The video region 1102 can provide a playback of video content. In some embodiments, the user can interact with video region 1102 to play, pause, fast-forward, rewind, or close out of the video. The transcript region 1104 can display a transcript of the recorded video. In some embodiments, the video region 1102 is displayed above the transcript region 1104, although any suitable arrangement can be used. In some embodiments, the transcript is a time-synced transcript in accordance with embodiments described above. In some embodiments, the display of the video region and the transcript region are automatically synchronized. For example, as the video is played back, the transcript region provides the portion of the time-synced transcript corresponding to the speech being played back. In some embodiments, UI17-19 includes a menu region 1110 that provides an affordance for switching menus (e.g., a feedback menu, a review menu, an editing menu).

The review menu provides a plurality of options for annotating a video. A user can select one or more words in the transcript. In some embodiments, selecting one or more words in the transcript can cause menu region 1106 to present one or more selectable UI elements (e.g., thumb-up button 1108). In some embodiments, the selected one or more words in the transcript can be visually distinguishable (e.g., surrounded by a colored box as shown in UI18). The user can then select one or more UI elements to apply annotations to the video. The annotations can then be visually displayed in transcript region 1104. In some embodiments, the selected one or more words can be visually distinguishable (e.g., preceded by an icon corresponding to the thumb-up button and shown in a different color as shown in UI19). In some embodiments, the transcript is a time-synced transcript. In some embodiments, the annotation can be visually displayed in video region 1102. For example, annotations entered on the transcript can be overlaid on the video in video region 1102 during play-back of the corresponding time segment. In some embodiments, the visual display of an annotation comprises a feedback icon selectable by the user.

Figure 12:
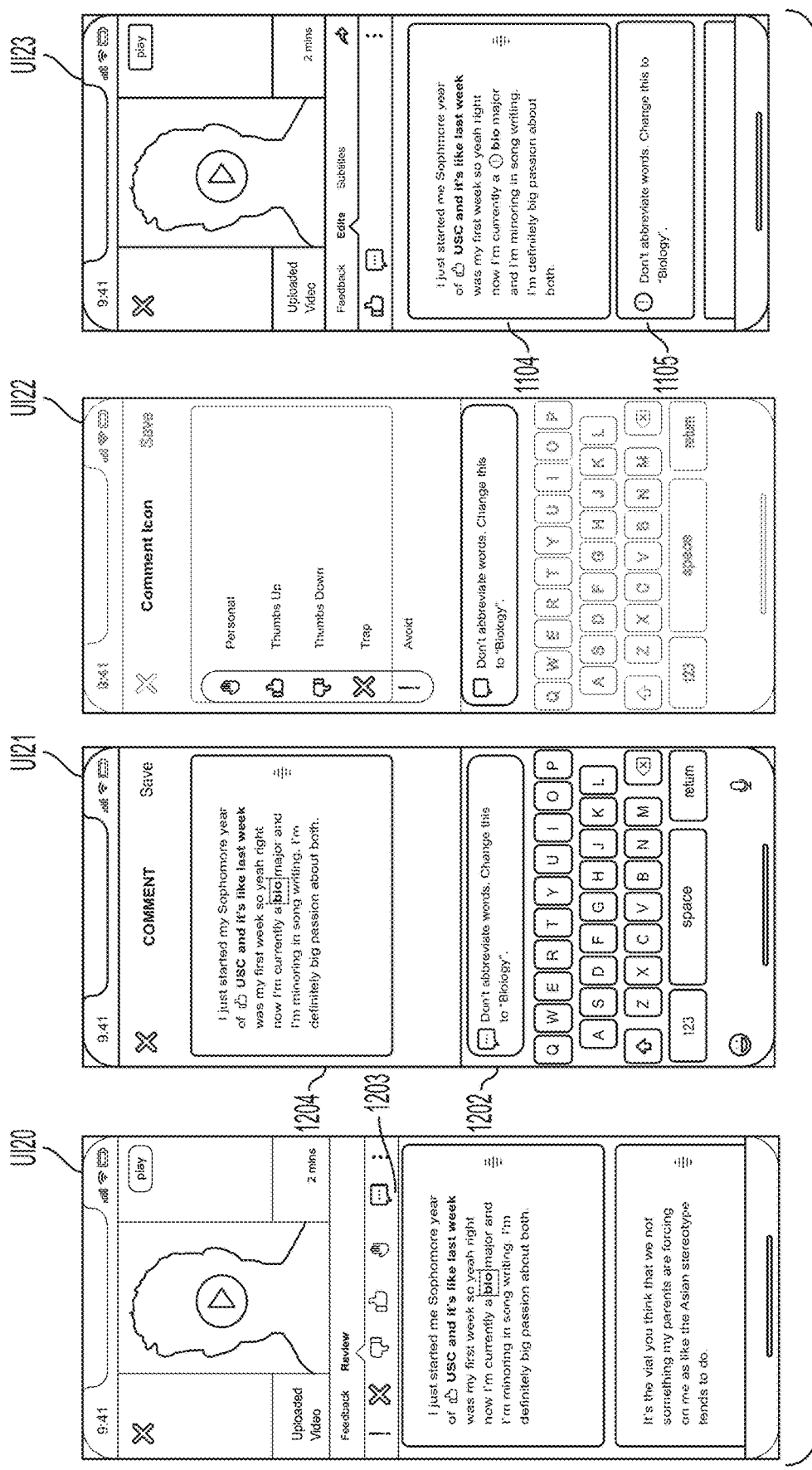
FIG. 12 illustrates an exemplary user interface for reviewing and editing media content in accordance with some embodiments of the disclosure.

FIG. 12 depicts an exemplary user interface for providing an annotation on a portion of a transcript, in accordance with some embodiments. The annotation user interface can allow the user to select (e.g., using a mouse or using a finger) a portion of a transcript. In some embodiments, the selected portion is visually distinguishable (e.g., as shown in UI20). The annotation user interface can provide an affordance for switching to a text-entering user interface (e.g., selecting a UI element 1203 in UI20, pressing and holding the selected portion). UI21 displays an exemplary annotation user interface comprising an input region 1202 and a transcript region 1204. Input region 1202 can provide an affordance for entering in comments. Input region 1202 can provide an affordance for textual input (e.g., a keyboard and a text box as displayed in UI21), visual input (e.g., a region for drawing), audio/video input (e.g., one or more UI elements that cause a recording to begin or end), or other inputs. In some embodiments, the transcript region 1204 shows only a portion of the complete transcript that contains the text selected by the user.

The annotation user interface can provide an affordance for assigning a property to the annotation. UI22 displays a plurality of predefined properties that can be associated with a comment. The predefined properties include: personal, thumbs up, thumbs down, trap, and avoid. Each property can have an associated property icon. UI22 shows an exemplary user interface for selecting a property icon to appear in relation to the comment or annotation. UI23 illustrates an exemplary user interface of an entered annotation. The annotation user interface may display the annotation along with the selected property icon displayed in the transcript region 1104. In some embodiments, the one or more selected words for commenting can be visually distinguished from the rest of the transcript. In the depicted example, the selected word has a different color than the rest of the transcript and is preceded by the selected property icon. In some embodiments, the annotation 1105 is also shown and visually distinguished from the rest of the transcript. In the depicted example, the annotation 1105 is in a different color text box than the rest of the transcript. The annotation 1105 can be displayed upon the user selection of the icon in the region 1104. In some embodiments, the annotation also has the selected icon that matches the selected property icon.

In some embodiments, the recorded video is paused in video region 1102 while the user and enters feedback. In some embodiments, a feedback system can allow the user to enter feedback while the recorded video is playing. In accordance with those embodiments, the user can select feedback buttons 1108 while the recorded video plays in video region 1102. The feedback system can store the user's feedback such that the recorded video can be played back with the user's feedback visually displayed on the screen at timestamps where the live coach entered the feedback. For example, if the user selected the thumbs-up feedback icon 1108 at two minutes into the recorded video, the feedback system can store that information such that the recorded video will display a thumbs-up icon two minutes in. In some embodiments, the feedback can also be reflected in the time-synced transcript.

FIGS. 13-18 illustrate a user interface for a text-based video editor, in accordance with some embodiments. A text-based video editor can allow a user to edit a video by editing a time-synced transcript of the video. In accordance with some embodiments, the user can delete or rearrange portions of text in the time-synced transcript. In accordance with some embodiments, the text-based video editor can then edit the video accordingly so that the output video is an edited version that reflects the edited time-synced transcript.

Figure 13:
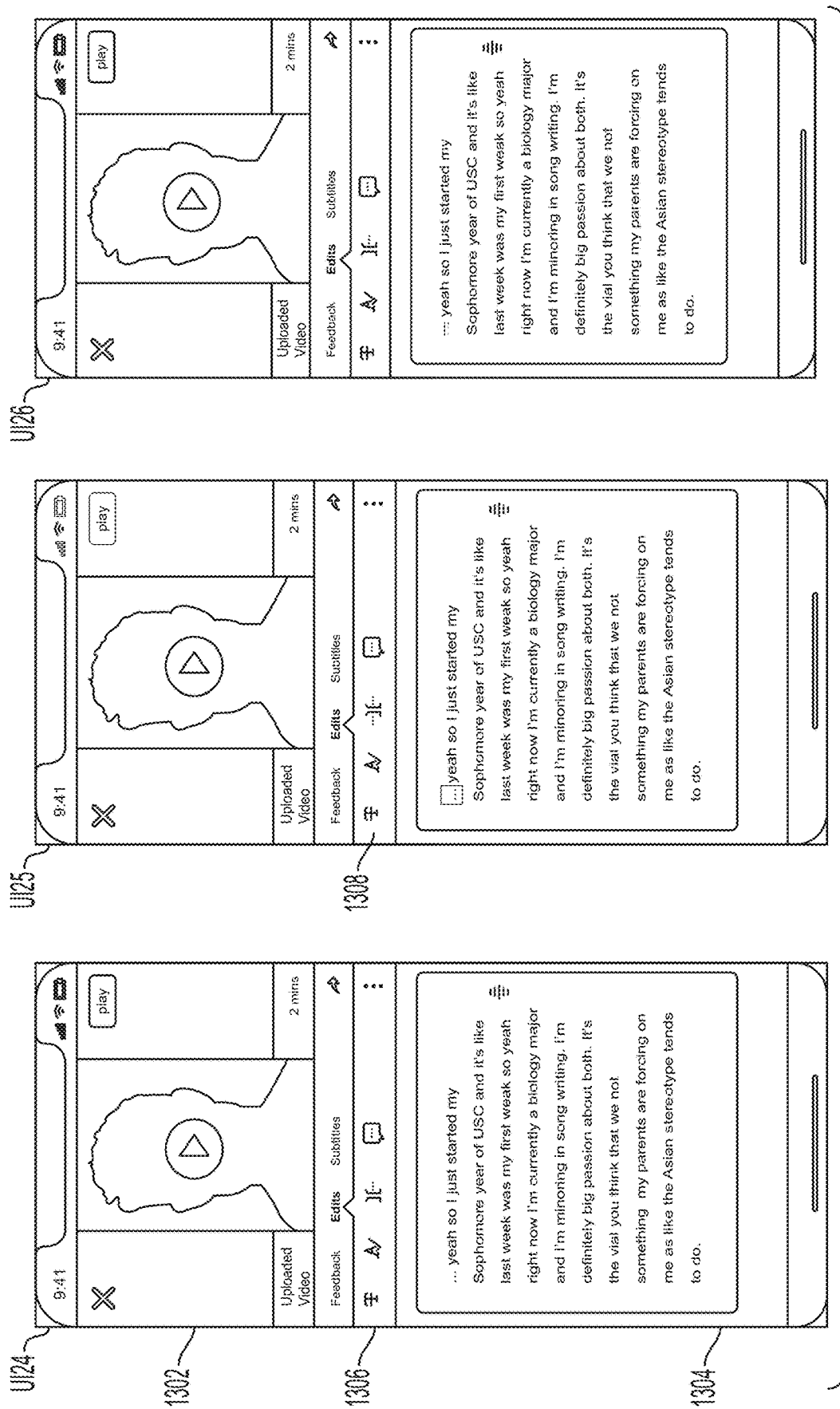
FIG. 13 illustrates an exemplary user interface for reviewing and editing media content in accordance with some embodiments of the disclosure.

In some embodiments, the user interface of the text-based video editor can comprise a video region 1302, a transcript region 1304, and an editing region 1306, as shown in UI24 of FIG. 13. In some embodiments, the video region 1302 is displayed at the top of the user interface, the editing region 1306 is displayed below video region 1302, and the transcript region 1304 is displayed below editing region 1306. However, it should be appreciated that other arrangements can be used.

In some embodiments, video region 1302 displays a recorded video. In some embodiments, the user can interact with video region 1302 to play, pause, fast-forward, rewind, or close out of the recorded video. In some embodiments, transcript region 1304 will display a time-synced transcript of the recorded video. As described in accordance with embodiments of FIG. 9, a time-synced transcript can associate transcribed words and pauses with the corresponding time segment in the recorded video.

Figure 14:
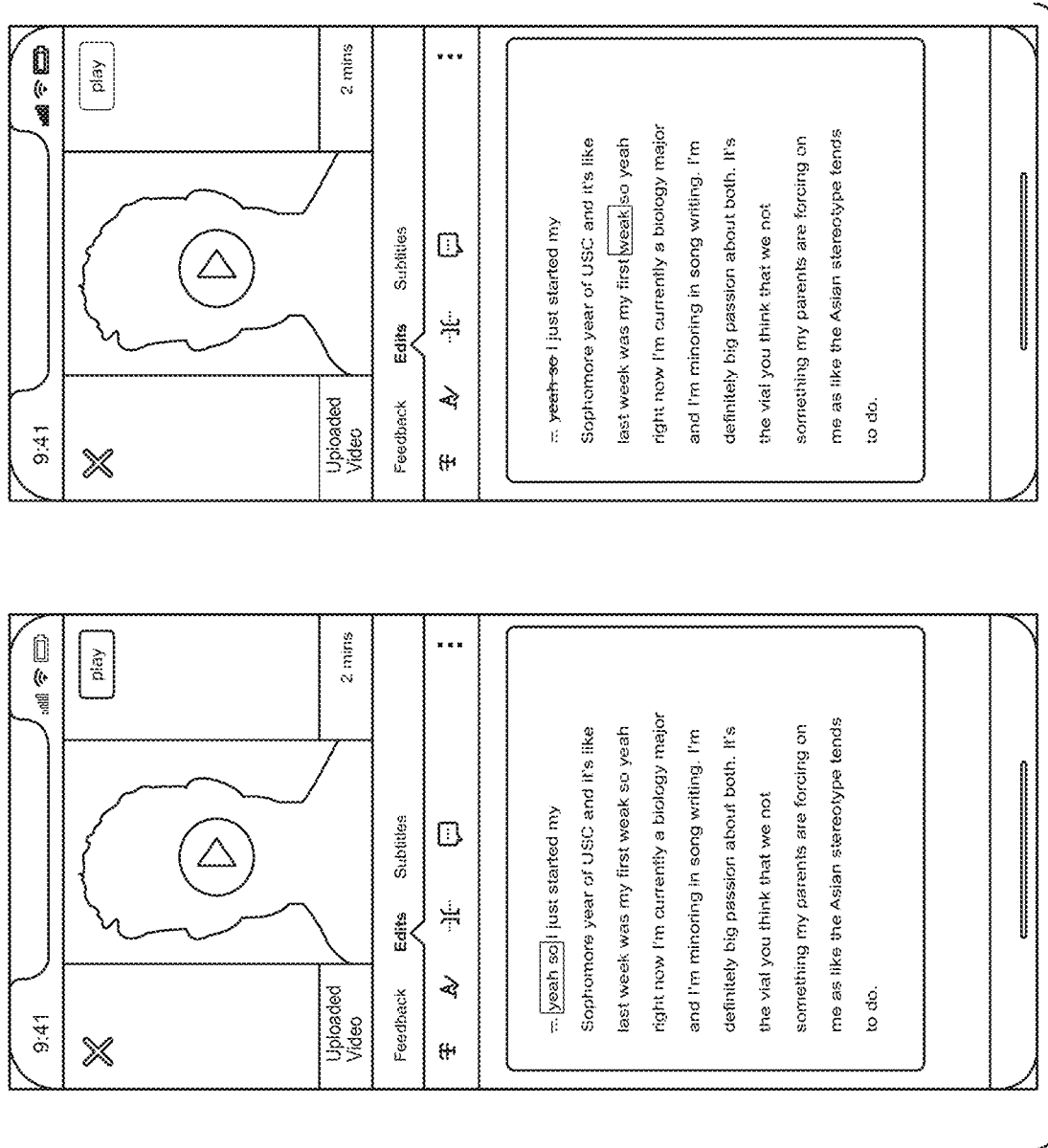
FIG. 14 illustrates an exemplary user interface for reviewing and editing media content in accordance with some embodiments of the disclosure.

In some embodiments, the user can select portions of the time-synced transcript to remove (e.g., using a mouse or using a finger). For example, UI25 illustrates the user having selected the ellipsis representing a pause. The selection can be visually distinguished. The user can then select editing element 1308, which can remove the ellipsis from the time-synced transcript. In some embodiments, the removed portions will be visually displayed in the transcript region 1304. For example, in UI26, the removed portion is marked in a different color and is struck-through. However, other methods of visually distinguishing the removed portion can be used. The removed portion can also simply not be shown in the transcript region 1304. FIG. 14 illustrates an embodiment where the user has also removed the text "yeah so" from the time-synced transcript.

In some embodiments, the removed portions will cause the text-based video editor to create an edited video where the associated time segments of the removed portions are removed from the recorded video. For example, FIG. 14 can depict an embodiment where the output video begins at "I just started," with the pause and "yeah so" removed from the beginning of the recorded video.

Figure 15:
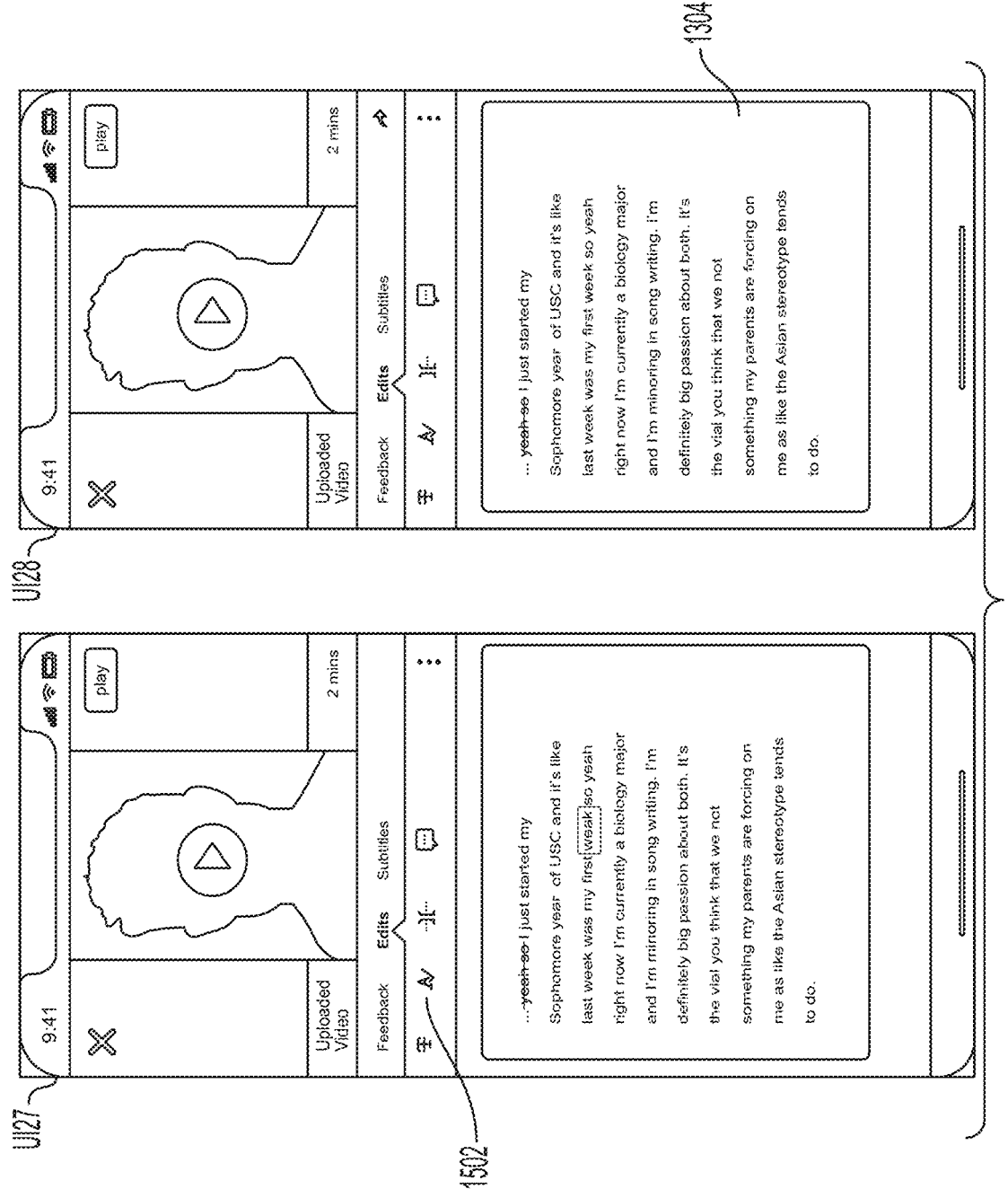
FIG. 15 illustrates an exemplary user interface for reviewing and editing media content in accordance with some embodiments of the disclosure.

FIG. 15 illustrates a user interface for correcting the time-synced transcript, in accordance with some embodiments. In UI27, the user can select one or more words that have been inaccurately transcribed. The user can then select editing element 1502 to correct the transcription. In some embodiments, the user can correct the transcription by manually entering in the correct transcription. In some embodiments, the text-based video editor can display one or more correction options for the user to select. In some embodiments, the corrected portion of the transcription will be visually distinguishable in transcript region 1304. In some embodiments, the corrected portion of the transcription will be distinguishable both from the unedited portions of the transcription and the removed portions of the transcription.

Figure 16:
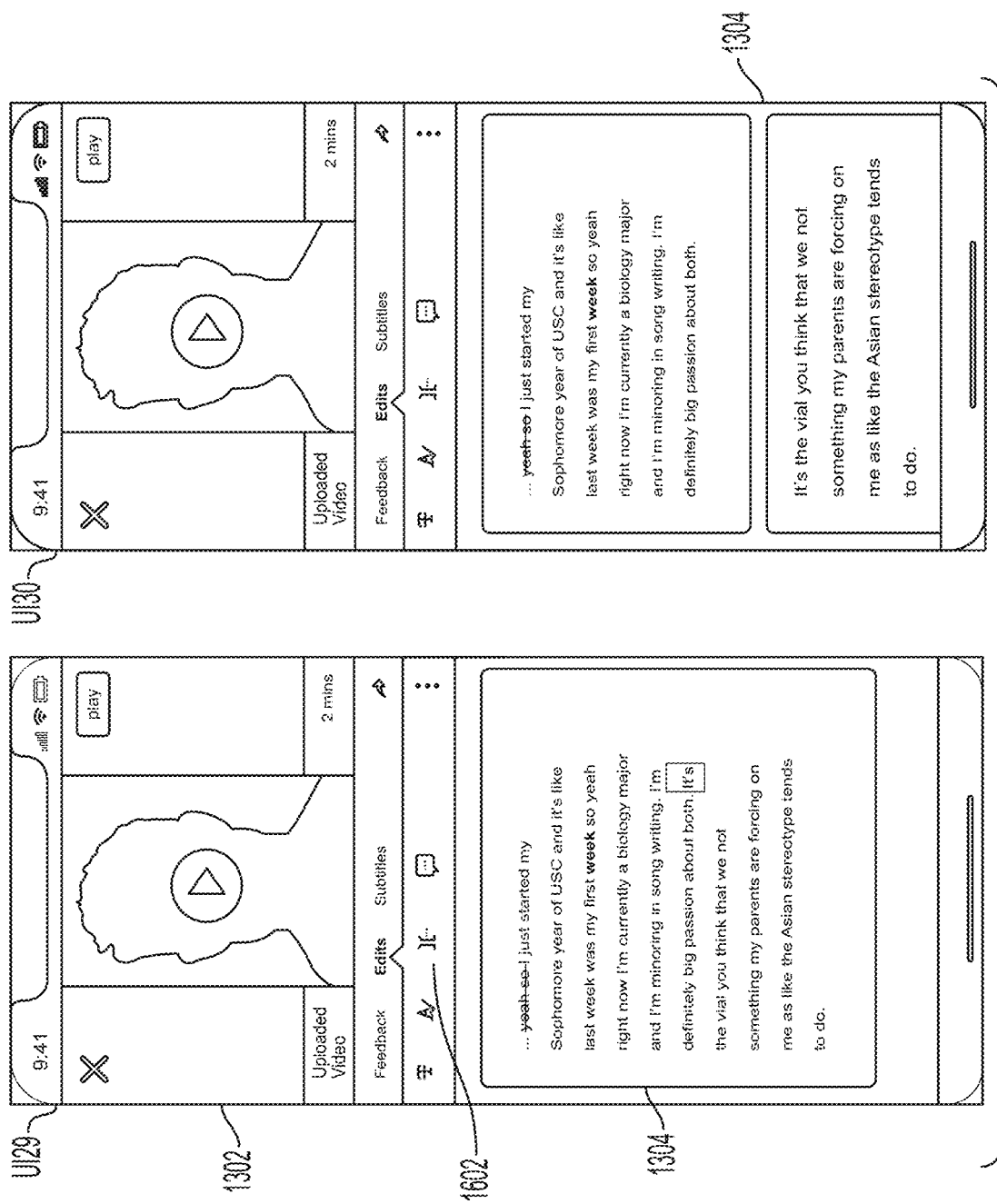
FIG. 16 illustrates an exemplary user interface for reviewing and editing media content in accordance with some embodiments of the disclosure.

FIG. 16 illustrates a user interface for customizing the segmentation of the time-synced transcript, in accordance with some embodiments. In UI29, the user can select a location where the user desires to create a new transcript segment. In some embodiments, the location can be a word that the user wishes to be the start of a new transcript segment. The user can then select editing element 1602, which causes a new transcript segment to be created at the user's selected location. In some embodiments, the new transcript segment is visually distinguishable from other transcript segments. For example, in UI30, two transcript segments are indicated by two separate text boxes, although other visual distinctions can be used.

In some embodiments, the user can edit the recorded video by rearranging transcript segments. In some embodiments, the user can rearrange the transcript segments by selecting, holding, and dragging a visual indicator. In some embodiments, the visual indicator can be a grab handle that comprises three horizontal lines stacked on top of each other, although other suitable indicators can be used. In some embodiments, the text-based video editor can output an edited video that plays the video segments in the order corresponding to the rearranged transcript segments. In some embodiments, the user can play back the edited video directly within the user interface in the video region 1302.

Figure 17:
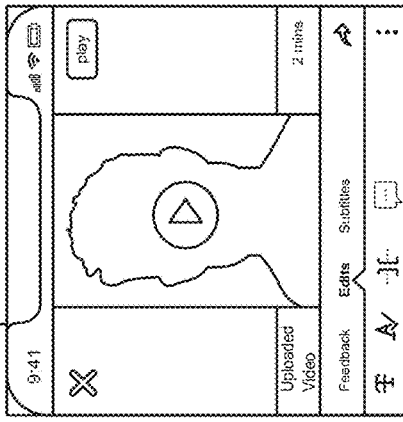
FIG. 17 illustrates an exemplary user interface for reviewing and editing media content in accordance with some embodiments of the disclosure.
Figure 17:
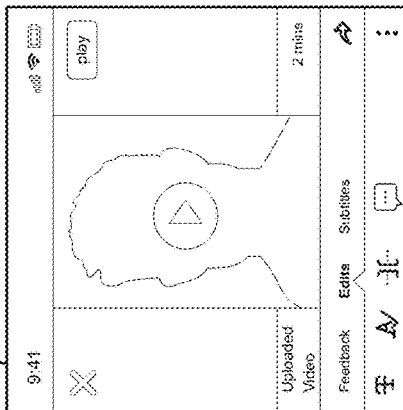
Figure 17:
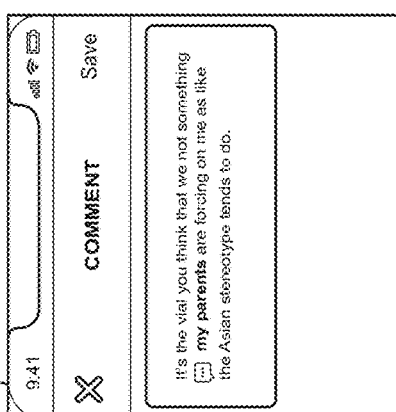
Figure 17:
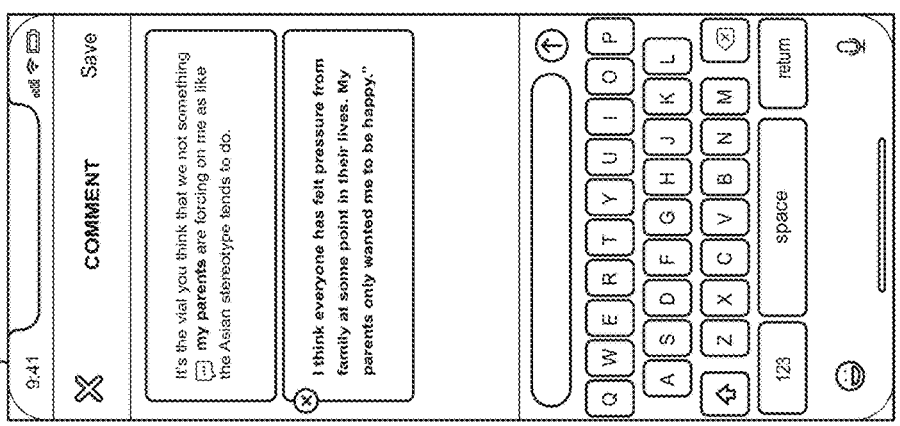

FIG. 17 illustrates a user interface for adding an annotation to the time-synced transcript in accordance with embodiments described above.

Figure 18:
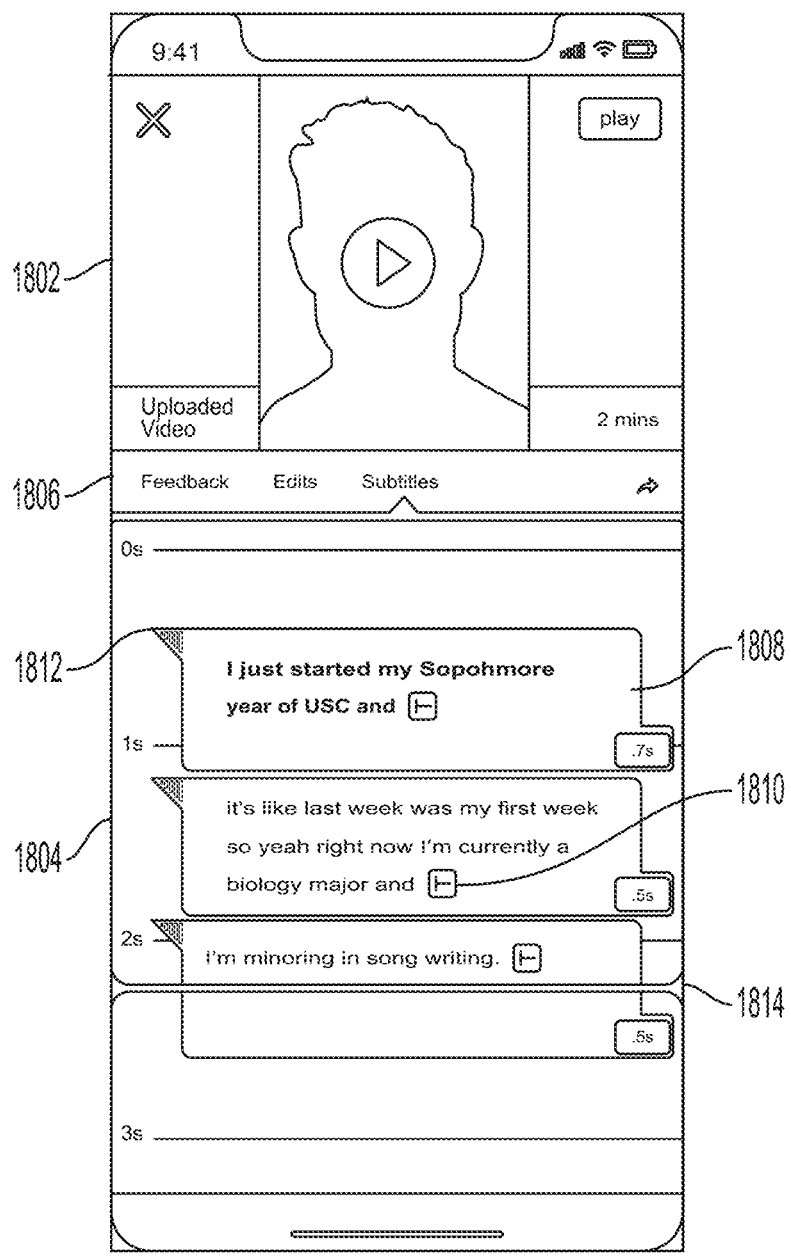
FIG. 18 illustrates an exemplary user interface for reviewing and editing media content in accordance with some embodiments of the disclosure.

FIG. 18 illustrates a user interface for adding subtitles to the recorded video such that the output video will display subtitles. In some embodiments, the user interface will comprise a video region 1802, a subtitle region 1804, and a menu region 1806. In some embodiments, the video region 1802 is located at the top of the user interface, and the video region can play back the recorded video. In some embodiments, the subtitle region 1804 is located at the bottom of the user interface. In some embodiments, the menu region 1806 is located in between the video region 1802 and the subtitle region 1804. The menu region 1806 can allow the user to switch between different user interfaces. For example, the menu region 1806 can allow the user to switch between the editing user interface and the subtitle user interface.

In some embodiments, subtitle region 1804 will comprise a visual timeline that corresponds to a video playback timeline. For example, if the recorded video is two minutes long, the visual timeline can show up to two minutes. In some embodiments, only part of the visual timeline is showed in the user interface. In some embodiments, the user can scroll the subtitle region 1804 to show different parts of the visual timeline.

In some embodiments, subtitle region 1804 will comprise one or more UI elements 1808. UI element 1808 can comprise text that will be displayed as a subtitle in the recorded video. UI element 1808 can also display the length of time that the subtitle should appear for. UI element 1808 can be automatically generated based on the time-synced transcript (e.g., the transcript and a plurality of mappings between portions of the transcript and timestamps). In some embodiments, the user can change both the subtitle text and the length of time the subtitle should appear for. In some embodiments, UI element 1808 is located on the visual timeline relative to where in the video playback timeline the subtitle should appear. For example, if the user desires to place a subtitle at 2 seconds into the recorded video, UI element 1808 can be located on the visual timeline at 2 seconds.

In some embodiments, UI element 1808 can also be dynamically sized relative to the timeline. For example, if the user further desires the subtitle to appear for one second, UI element 1808 can be displayed on the visual timeline as beginning at 2 seconds and ending at 3 seconds. In some embodiments, the subtitle on the output video will then begin at 2 seconds into the output video, be displayed for one second, and then disappear at 3 seconds into the output video.

In some embodiments, the user can also rearrange UI element 1808 on the visual timeline. In some embodiments, the user can select, hold, and drag UI element 1808 to a different location on the visual timeline. In some embodiments, UI element 1808 will comprise a visual indicator where the user can select, hold, and drag UI element 1808. For example, the visual indicator can be UI element 1810, or the visual indicator can be UI element 1812.

In some embodiments, subtitle region 1804 can comprise a playback indicator 1814. According to some embodiments, playback indicator 1814 can move relative to the visual timeline while the recorded video plays in video region 1802. In some embodiments, playback indicator 1814 indicates the current place of the video playback timeline on the visual timeline. For example, if the recorded video is paused at 2.2 seconds, the playback indicator 1814 can be located on the visual timeline between 2 seconds and 3 seconds. According to embodiments where the recorded video is playing in video region 1802, the visual indicator can move on the visual timeline accordingly.

In some embodiments, the editing system performs the edits (e.g., cutting frames, rearranging portions, adding subtitles) directly during playback of the recorded video in the video region. In some embodiments, the edits are not finalized until the recorded video is exported to allow the user to see what edits have been made and to reverse edits or add additional edits. For example, until the user selects to finalize the video, the system leaves the original video unmodified, but generates and stores representations of the edits in association with the original video. A representation of an edit can comprise one or more timestamps, the type of edit, the corresponding transcript portion, the corresponding video portion, or any combination thereof. For example, when the user removes a word from the transcript, the system generates a representation of the edit, which comprises the timestamps indicating the beginning and the end of the utterance of the word in the video and the type of edit (i.e., removal). As another example, when the user reverses two video segments, the system generates a representation of the edit, which comprises a sequence of timestamp ranges, with each timestamp range representing a video segment (e.g., playing 0.5 s-0.06 first, then 0 s-0.4 s). As another example, when the user edits a subtitle (e.g., the content or duration), the system updates a text file, which comprises a plurality of text strings representation the plurality of subtitles and the beginning and ending timestamps corresponding to each text string. As discussed above, the initial version of the text file can be automatically generated based on the time-synced transcript (e.g., a transcript and a plurality of mappings between portions of the transcript and the corresponding timestamps). In some embodiments, the system aggregates multiple edits to generate a single representation of all the edits. For example, the aggregated edits can comprises a sequence of timestamp ranges, with each timestamp range representing a video segment.

As such, the system can provide a preview of the edited video by playing back and/or skipping segments of the original video and overlaying text strings on the video based on the stored representations of edits, without altering the original video. After the user selects to finalize the video, the system generates a new video file based on the original video file and the representations of edits.

In some embodiments, the editing system uses the Core Video framework on iOS to play edits back live. In some embodiments, the exported video is a standard video file format. In some embodiments, the exported video does not show removed portions, and in some embodiments, the exported video is compatible across platforms. In some embodiments, the exported video can be shared directly to social media platforms.

The editing system has the advantage of being a more convenient way of editing videos than editing the video directly. Direct editing of the video can require the user to watch and re-watch the recorded video to identify the precise time that a cut should be made. The editing system, in accordance with some embodiments, can allow a user to simply scroll through a time-synced transcript and identify where a cut should be made. The editing system further has the advantage of not requiring a complicated UI that shows a ribbon of video frames. It is desirable to enable video editing on-the-fly using a mobile device that can both record the video and then edit the video without exporting the recorded video to a more powerful computer. The editing system enables this by employing a simple UI that can still achieve the same results as direct video editors in an easier, more accessible manner.

In some embodiments, any or all of the above analysis steps (e.g., 804, 805, 806, 807, 808, or 809) can be performed by artificial intelligence, machine learning, neural network, or other suitable means. Although FIG. 8 illustrates the steps as sequential steps, this is meant to be illustrative of one embodiment and not limiting. Any or all of these steps can be performed in parallel or can be performed in an order different from those shown without departing from the scope of this disclosure. In some embodiments, the audio and video components can be analyzed together (i.e. not processed separately, or in separate steps).

In some embodiments, the embodiments described above can be implemented on an electronic device or other suitable computing system. The system may include, but is not limited to known components such as central processing unit (CPU), storage, memory, network adapter, power supply, input/output (I/O) controllers, electrical bus, one or more displays, one or more user input devices, and other external devices. It will be understood by those skilled in the art that system may contain other well-known components which may be added, for example, via expansion slots, or by any other method known to those skilled in the art. Such components may include, but are not limited to, hardware redundancy components (e.g., dual power supplies or data backup units), cooling components (e.g., fans or water-based cooling systems), additional memory and processing hardware, and the like.

The system may be, for example, in the form of a client-server computer capable of connecting to and/or facilitating the operation of a plurality of workstations or similar computer systems over a network. In another embodiment, the system may connect to one or more workstations over an intranet or internet network, and thus facilitate communication with a larger number of workstations or similar computer systems. Even further, the system may include, for example, a main workstation or main general purpose computer to permit a user to interact directly with a central server. Alternatively, the user may interact with the system via one or more remote or local workstations. As will be appreciated by one of ordinary skill in the art, there may be any practical number of remote workstations for communicating with the system.

The CPU on the system may include one or more processors, for example Intel® Core™ i7 processors, AMD FX™ Series processors, ARM-based processors (e.g., Apple® Ax family processors, Samsung® Exynos™ series processors, or other ARM-based processors) or other processors as will be understood by those skilled in the art (e.g., including graphical processing unit (GPU)-style specialized computing hardware used for, among other things, machine learning applications, such as training and/or running the machine learning algorithms of the disclosure). CPU may further communicate with an operating system, such as Windows NT® operating system by Microsoft Corporation, Linux operating system, or a Unix-like operating system. However, one of ordinary skill in the art will appreciate that similar operating systems may also be utilized. Storage (e.g., non-transitory computer readable medium) may include one or more types of storage, as is known to one of ordinary skill in the art, such as a hard disk drive (HDD), solid state drive (SSD), hybrid drives, and the like. In one example, storage is utilized to persistently retain data for long-term storage. Memory (e.g., non-transitory computer readable medium) may include one or more types of memory as is known to one of ordinary skill in the art, such as random access memory (RAM), read-only memory (ROM), hard disk or tape, optical memory, or removable hard disk drive. Memory may be utilized for short-term memory access, such as, for example, loading software applications or handling temporary system processes.

As will be appreciated by one of ordinary skill in the art, storage and/or memory may store one or more computer software programs. Such computer software programs may include logic, code, and/or other instructions to enable processor to perform the tasks, operations, and other functions as described herein (e.g., the analysis, video playback, video editing, etc. functions described herein), and additional tasks and functions as would be appreciated by one of ordinary skill in the art. Operating system may further function in cooperation with firmware, as is well known in the art, to enable processor to coordinate and execute various functions and computer software programs as described herein. Such firmware may reside within storage and/or memory.

Moreover, I/O controllers may include one or more devices for receiving, transmitting, processing, and/or interpreting information from an external source, as is known by one of ordinary skill in the art. In one embodiment, I/O controllers may include functionality to facilitate connection to one or more user devices, such as one or more keyboards, mice, microphones, trackpads, touchpads, or the like. For example, I/O controllers may include a serial bus controller, universal serial bus (USB) controller, FireWire controller, and the like, for connection to any appropriate user device. I/O controllers may also permit communication with one or more wireless devices via technology such as, for example, near-field communication (NFC) or Bluetooth™. In one embodiment, I/O controllers may include circuitry or other functionality for connection to other external devices such as modem cards, network interface cards, sound cards, printing devices, external display devices, or the like. Furthermore, I/O controllers may include controllers for a variety of display devices known to those of ordinary skill in the art.

Such display devices may convey information visually to a user or users in the form of pixels, and such pixels may be logically arranged on a display device in order to permit a user to perceive information rendered on the display device. Such display devices may be in the form of a touch-screen device, traditional non-touch screen display device, or any other form of display device as will be appreciated be one of ordinary skill in the art.

Furthermore, a CPU may further communicate with I/O controllers for rendering a graphical user interface (GUI) (e.g., the GUIs described with reference to FIGS. 1-8) on, for example, one or more display devices. In one example, the CPU may access storage and/or memory to execute one or more software programs and/or components to allow a user to interact with the system as described herein. In one embodiment, a GUI as described herein includes one or more icons or other graphical elements with which a user may interact and perform various functions. For example, the GUI may be displayed on a touch screen display device, whereby the user interacts with the GUI via the touch screen by physically contacting the screen with, for example, the user's fingers. As another example, GUI may be displayed on a traditional non-touch display, whereby the user interacts with the GUI via keyboard, mouse, and other conventional I/O components. The GUI may reside in storage and/or memory, at least in part as a set of software instructions, as will be appreciated by one of ordinary skill in the art. Moreover, the GUI is not limited to the methods of interaction as described above, as one of ordinary skill in the art may appreciate any variety of means for interacting with a GUI, such as voice-based or other disability-based methods of interaction with a computing system.

Moreover, a network adapter may permit device to communicate with network. Network adapter may be a network interface controller, such as a network adapter, network interface card, LAN adapter, or the like. As will be appreciated by one of ordinary skill in the art, network adapter may permit communication with one or more networks, such as, for example, a local area network (LAN), metropolitan area network (MAN), wide area network (WAN), cloud network (IAN), or the Internet.

One or more workstations may include, for example, known components such as a CPU, storage, memory, network adapter, power supply, I/O controllers, electrical bus, one or more displays, one or more user input devices, and other external devices. Such components may be the same, similar, or comparable to those described with respect to system above. It will be understood by those skilled in the art that one or more workstations may contain other well-known components, including but not limited to hardware redundancy components, cooling components, additional memory/processing hardware, and the like.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A computer-implemented method, comprising:
receiving a first user input indicative of a selection of an interview question from a plurality of interview questions;
responsive to receiving the first user input, causing rendering of a first user interface at an electronic device of a user, wherein the first user interface comprises:
text corresponding to the selected interview question, and
a user control for recording a speech response to the selected interview question;
after causing rendering of the first user interface, obtaining recorded data comprising speech by the user;
analyzing the recorded data to calculate a speech rate of the speech;
determining whether the calculated speech rate exceeds a predefined threshold;
in accordance with a determination that the speech rate exceeds the predefined threshold, causing rendering of a second user interface at the electronic device of the user, wherein the second user interface comprises:
an interactive representation of the recorded data for providing a playback of the recorded data comprising speech by the user;
the calculated speech rate, wherein the calculated speech rate is displayed below the interactive representation of the recorded data; and
an indication of whether the calculated speech rate exceeds the predefined threshold.

2. The method of claim 1, further comprising: rendering an overall analysis score, wherein the overall analysis score is at least partially based on the calculated speech rate.

3. The method of claim 1, wherein the recorded data comprises audio data, image data, video data, or any combination thereof.

4. The method of claim 1, wherein the speech rate comprises a number of words per minute.

5. The method of claim 1, wherein the indication of whether the calculated speech rate exceeds the predefined threshold comprises an indication of whether the speech is of an appropriate talking speed.

6. The method of claim 1, wherein the indication of whether the calculated speech rate exceeds the predefined threshold comprises a graphical representation.

7. The method of claim 6, wherein the predefined issue comprises: flowery speech, a duplicate word, a controversial topic, a personal topic, a cliché, a curse word, an overused word, a positive phrase, a filler word, or any combination thereof.

8. The method of claim 6, wherein the rendered user interface comprises a number of predefined issues detected.

9. The method of claim 1, wherein the recorded data is analyzed to detect a predefined issue with the transcript, and wherein the rendered user interface comprises an indication of the predefined issue.

10. The method of claim 1, wherein the speech by the user is a response to an interview question.

11. The method of claim 1, wherein the speech by the user is a response to a speaking prompt.

12. The method of claim 1, wherein the recorded data is analyzed to determine sophistication of phrases, grammar, sentence structure, vocabulary of the speech, or any combination thereof.

13. The method of claim 1, wherein the recorded data is analyzed to determine pitch, tone, quality, cadence, or any combination thereof.

14. The method of claim 1, wherein the recorded data is analyzed using a machine-learning algorithm.

15. The method of claim 1, wherein the rendered user interface comprises a transcript of the speech.

16. The method of claim 1, wherein interactive representation of the recorded data is above the calculated speech rate in the rendered user interface.

17. The method of claim 1, further comprising: before recording the data, prompting the user to prepare for recording.

18. A non-transitory computer-readable storage medium storing one or more programs, the one or more programs comprising instructions, which when executed by one or more processors of an electronic device having a display, cause the electronic device to:
 receiving a first user input indicative of a selection of an interview question from a plurality of interview questions;
 responsive to receiving the first user input, causing rendering of a first user interface at an electronic device of a user, wherein the first user interface comprises:
  text corresponding to the selected interview question, and
  a user control for recording a speech response to the selected interview question;
 after causing rendering of the first user interface, obtain recorded data comprising speech by the user;
 analyze the recorded data to calculate a speech rate of the speech;
 determine whether the calculated speech rate exceeds a predefined threshold;
 in accordance with a determination that the speech rate exceeds the predefined threshold, causing rendering of a second user interface at the electronic device of the user, the second user interface comprising:
  an interactive representation of the recorded data for providing a playback of the recorded data comprising speech by the user;
  the calculated speech rate, wherein the calculated speech rate is displayed below the interactive representation of the recorded data; and
  an indication of whether the calculated speech rate exceeds the predefined threshold.

19. An electronic device, comprising:
 one or more processors;
 a memory; and
 one or more programs, wherein the one or more programs are stored in the memory and configured to be executed by the one or more processors, the one or more programs including instructions for:
 receiving a first user input indicative of a selection of an interview question from a plurality of interview questions;
 responsive to receiving the first user input, causing rendering of a first user interface at an electronic device of a user, wherein the first user interface comprises:
  text corresponding to the selected interview question, and
  a user control for recording a speech response to the selected interview question;
 after causing rendering of the first user interface, obtaining recorded data comprising speech by the user;
 analyzing the recorded data to calculate a speech rate of the speech;
 determining whether the calculated speech rate exceeds a predefined threshold;
 in accordance with a determination that the speech rate exceeds the predefined threshold, causing rendering of a second user interface comprising:
  an interactive representation of the recorded data for providing a playback of the recorded data comprising speech by the user;
  the calculated speech rate, wherein the calculated speech rate is displayed below the interactive representation of the recorded data; and
  an indication of whether the calculated speech rate exceeds the predefined threshold.

\* \* \* \* \*